United States Patent [19]

Abe et al.

[11] Patent Number: 4,764,667
[45] Date of Patent: Aug. 16, 1988

[54] BAR-CODE LABEL APPLICABLE FOR BAR-CODE CONTROLLED MANUFACTURING INCLUDING PAINTING PROCESS AND PRODUCTION METHOD THEREFOR

[75] Inventors: Kazuyoshi Abe, Hoya; Kazuhiko Yazaki, Musashimurayama, both of Japan

[73] Assignee: Nissan Motor Company, Limited, Yokohama, Japan

[21] Appl. No.: 564,672

[22] Filed: Dec. 23, 1983

[30] Foreign Application Priority Data

Dec. 28, 1982 [JP] Japan .................................. 57-232972

[51] Int. Cl.$^4$ ............................................. G06K 7/10
[52] U.S. Cl. ..................................... 235/462; 235/472; 235/487; 235/489
[58] Field of Search ............... 235/462, 472, 487, 566, 235/489; 250/568

[56] References Cited

U.S. PATENT DOCUMENTS

| | | | |
|---|---|---|---|
| 3,525,867 | 8/1970 | Konrad | 250/209 |
| 3,809,863 | 5/1974 | Oberg | 235/472 |
| 3,862,400 | 1/1975 | Thomson | 250/568 |
| 4,401,892 | 8/1983 | Peters | 250/566 |
| 4,523,088 | 6/1985 | Utsch | 235/462 |

Primary Examiner—Harold I. Pitts
Attorney, Agent, or Firm—Foley & Lardner, Schwartz, Jeffery, Schwaab, Mack, Blumenthal & Evans

[57] ABSTRACT

A bar-code label has a combination of a plurality of narrower slots and a plurality of wider slots encoded to represent specific binary data containing information and/or instructions. The slotted bar-code is encoded on a rigid label member, such as a metal sheet. A bar-code encoding device used to encode the slotted bar-code has a pair of punches, one of which is adapted to form the narrower slots and the other of which is adapted to form the wider slots. Both of the punches are operated simultaneously whenever one of the narrower or wider slots is formed. The blank label is fed past one of the punches to form all of the narrower or wider slots before forming the rest of the wider or narrower slots with the other punch. The encoded label thus formed is suitable for use in painting or coating processes which would obscure a conventionally printed bar-code label.

9 Claims, 22 Drawing Sheets

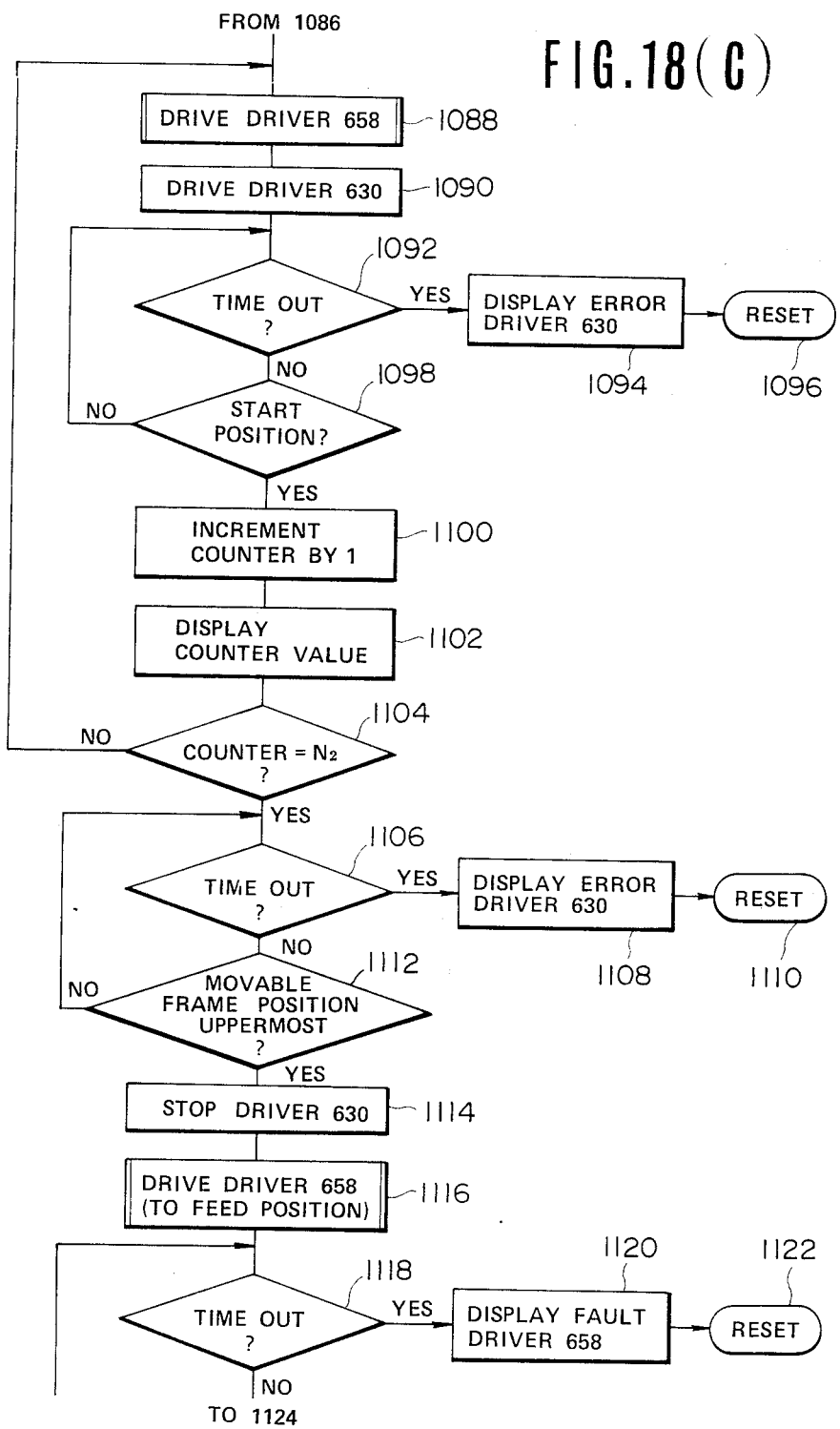

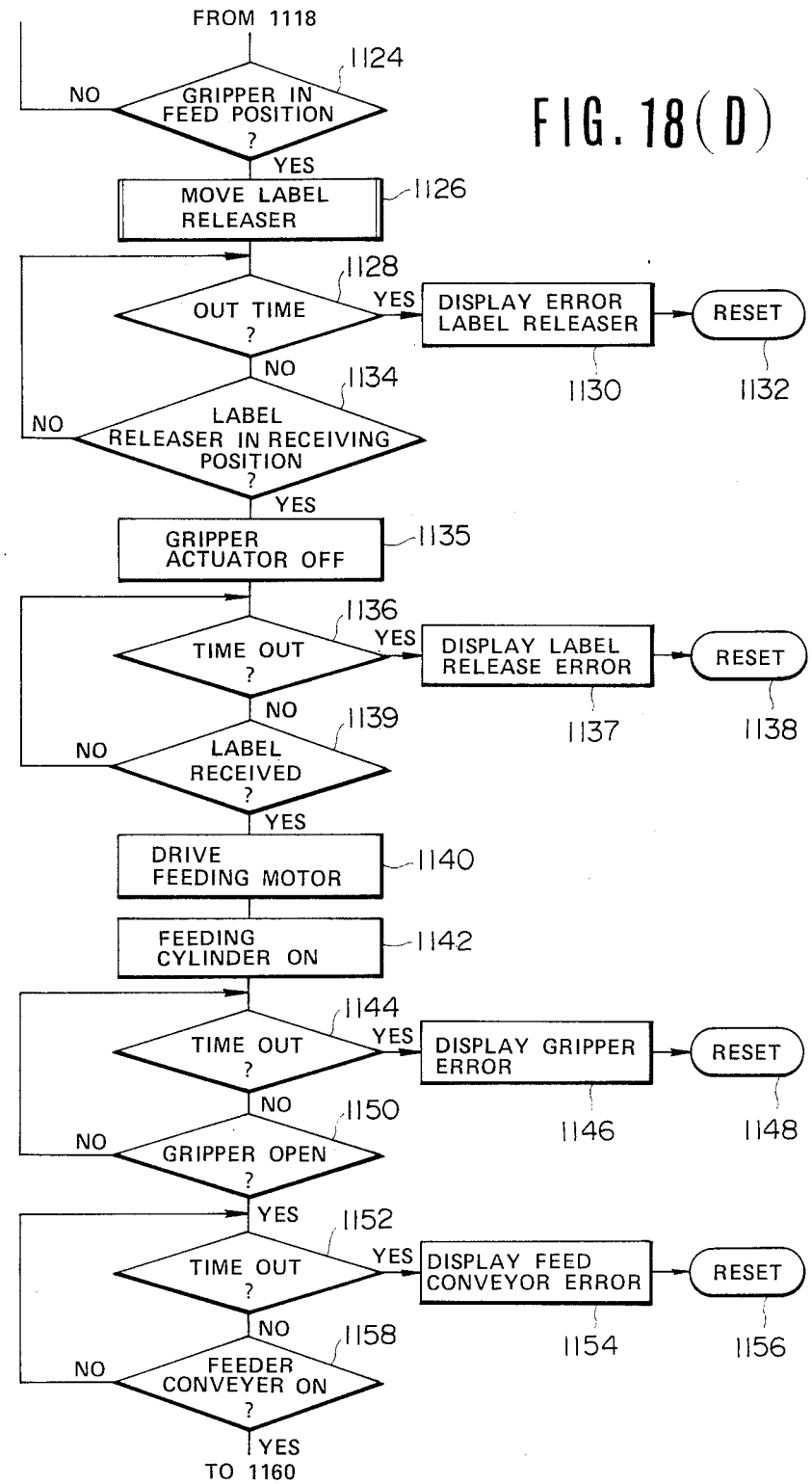

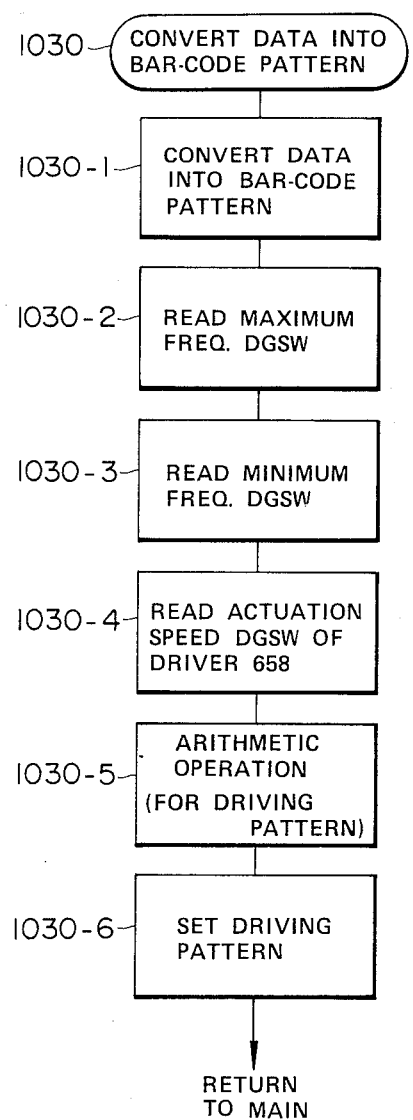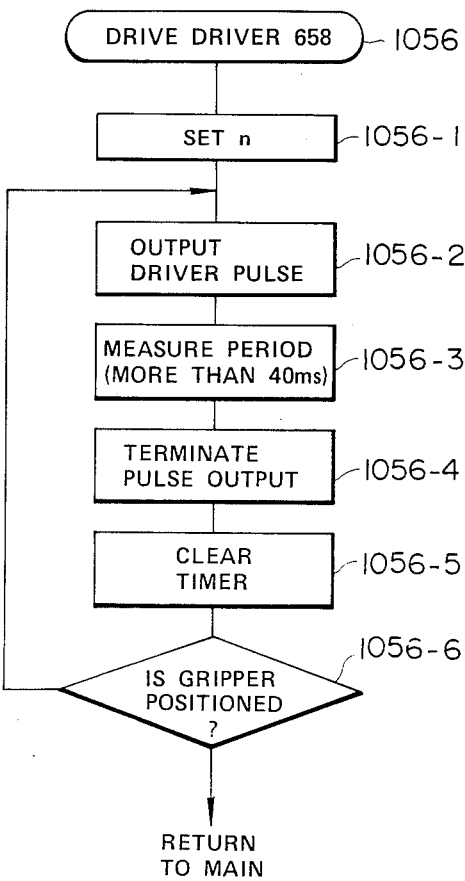

BAR-CODE LABEL APPLICABLE FOR BAR-CODE CONTROLLED MANUFACTURING INCLUDING PAINTING PROCESS AND PRODUCTION METHOD THEREFOR

BACKGROUND OF THE INVENTION

The present invention relates generally to a bar-code controlled manufacturing process, such as an automotive vehicle assembling process. More particularly the invention relates to a bar-code label adapted for use in a manufacturing process including a painting step to be controlled by means of the bar-code. The invention further relates to a method and device for producing the bar-code label for use in control of a painting process.

U.S. Pat. No. 4,332,012 to Sekine et al, which has been assigned to the assignee of the present invention, discloses a control system for an automotive vehicle component assembly line employing a bar-code label containing information and instructions relating to the model, type and specifications of the vehicle components to be assembled. The disclosure thereof is particularly directed to a sequence of assembly lines for assembling automotive vehicle bodies, which includes a pre-assembly station, a floor assembly line, a body assembly line, a body finishing line and others. A bar-code label is in the form of a magnetic rubber label on which a bar code is printed. The bar-code label is fitted or magnetically attached to a sub- or pre-assembly used in the assembly line to carry bar-coded information and instructions relating to the model, type and specifications of the vehicle body to be assembled. This bar code must be removed before the assembled vehicle body is led to a painting process.

It can easily be appreciated that it would be more convenient for the bar-code label to be carried with the assembled vehicle body to the painting process to provide the necessary information and instructions for painting the vehicle body. However, as is well known, in the painting process, there are a plurality of painting steps, such as preparation, primer coating, final coating, etc. If the printed bar-code is used, it will become obscured from an optical reader after the initial coat is applied to the vehicle body. Therefore, such printed bar-code labels cannot be used in the painting process.

SUMMARY OF THE INVENTION

Therefore, it is an object of the present invention to provide a bar-code label which is applicable to the painting process and suitable for providing information and instructions for each station or booth throughout the painting process.

Another object of the invention is to provide a method for producing the bar-code label, including a process for encoding the bar code on the label.

A further object of the invention is to provide a device suitable for performing the foregoing method of preparing the bar-code label.

According to the present invention, a bar-code label is formed from a rigid-strip or sheet of metal. A plurality of slots are formed on the label. Slots have wide or narrow configurations, enabling binary encoding.

In vehicle body manufacturing, bar-code labels with slotted code elements will be suspended from a wheel house or the like in order not to interfere with assembling and painting operations.

A method for producing the bar-code label with slotted code elements includes reading data relating to model, type and specifications of the products to be manufactured. Data identifying the specific models, types and specifications of products can be provided fed sequentially or continuously. In the inventive method, blank labels are supplied at regular intervals from a storage area. The blank labels are fed through a pair of punches which are separated by a distance greater than the length of the label. One of the punches is adapted to form the narrower slots and the other is adapted to form the wider slots. Both of the punches are operated at the same time whenever a slot is formed in the label. Therefore, all of the narrower or wider slots are formed before forming any of the wider or narrower slots, respectively.

According to one aspect of the invention, a method for preparing a bar-code label with a plurality of identical first slots and a plurality of identical second slots of different size, a specific combination of the first and second slots representing specific binary data, comprises the steps of converting specific binary data into a bar-code pattern which consists of a specific combination of first and second slots, determining the specific locations on a rigid blank label at which to form the first and second slots according to the determining bar-code pattern, feeding said blank label to a punch press with a first punch adapted to form said first slots and a second punch adapted to form the second slots, moving the blank label below the first punch and stopping the blank label at the specific location of each of said first slots operating the first punch to form the first slot by the first punch at the specific location while the blank label is stopped below the first punch, moving the blank label below the second punch and stopping the blank label at the specific location of each of the second slots, and operating the second punch to form the second slots while the blank label is stopped below the second punch.

A device for encoding the bar-code in the blank label, according to the present invention, has a label feeder for carrying the label between the two punching station. The device has a pair of punches, one of which is adapted to form the narrower slots and the other of which is adapted to form the wider slots. The feeder and punches are controlled by means of a controller which receives sequentially or continuously transmitted data relating to models, types and specifications of the products, such as a vehicle body to be assembled. The punches are operated simultaneously are separated by a distance greater than the length of the label so that only one of the narrower and wider slots may be formed in the label at a time.

The feeder moves the label through a specific, determined distance per each punching operation. All of the slots of noe width are formed before any of the slots with the other width are formed.

According to one aspect of the invention, a device for preparing a bar-code label with a plurality of identical first slots and a plurality of identical second slots of different size arranged on the label to form a bar-code pattern representative of specific binary data comprises a first punch means operative for forming the first slots in the blank label, the first punch means being installed at a first station at which the first slots are formed, a second punch means provided at a second station at which the second slots are formed for forming said second slots, a holder means for firmly holding the blank label, said holder means being movable between the first and second stations, a first actuator associated with the holder means for driving the latter to hold the blank label, a second actuator associated with the holder means for moving the latter between the first and second stations, and a controller associated with the first and second punch means and the first and second actuator for controlling operations thereof, the controller adapted to receive a signal indicative of the specific data number and converting the specific binary data into the bar-code pattern to be encoded in the blank label, and the controller outputting control signals to the punch means and the actuators for controlling the operations thereof according to the determined bar-code pattern.

Further, according to the present invention, there is provided a bar-code label applicable to manufacturing process for identifying components to be assembled into an assembly to be manufactured and for controlling manufacturing operations, comprising blank label adapted to be attached to a selected one of said components, a plurality of identical first slots formed in the label, a plurality of identical second slots formed in the label, the second slot being larger than the first slots, the first and second slots being so arranged in combination as to be indicative of the components and required manufacturing operations.

BRIEF DESCRIPTION OF THE DRAWINGS

The present invention will be described in more detail with reference to the preferred emobodiment of the present invention, which however, should not be taken to limit the invention but are for explanation and clarification only.

In the drawings:

FIGS. 18(a) to 18(e) form a flowchart of a sequence of control program to be executed by a controller in the control system of FIG. 17 to control the operation of the foregoing bar-code encoding device;

FIGS. 19, 20, and 22 are flowcharts of sub-routines of the control program of FIGS. 18(a) to 18(e)

DESCRIPTION OF THE PREFERRED EMBODIMENT

The preferred embodiment of a bar-code label and production thereof will be described below in terms of application to an automotive vehicle body assembly process including the process of painting the assembled vehicle body.

Although the preferred embodiment of the bar-code label will be shown in terms of application to automotive vehicle body assembly, it should be appreciated that the bar-code label according to the present invention is applicable not only to an automotive vehicle manufacture but also other manufacturing processes which may include painting processes or the like to which the printed bar code of the prior art could not be applied. Particularly, the bar-code label control employing the bar code of the present invention would be useful in any manufacturing process in which various types, models or specifications of products or components are assembled in a single common line and painted in a subsequent painting line.

Figure 1:
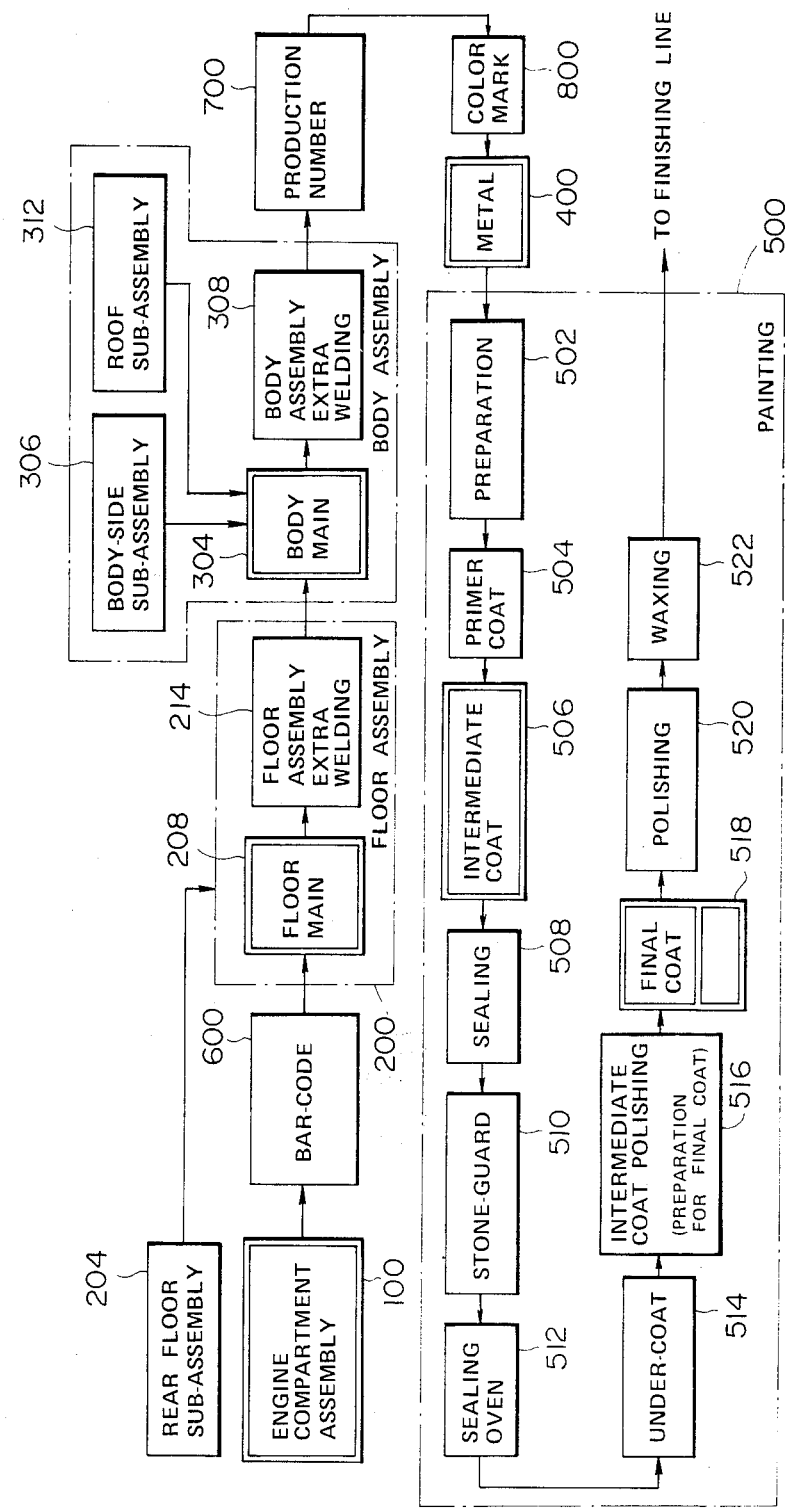
FIG. 1 is a schematic block diagram of an automotive vehicle body manufacturing process including painting steps to which the preferred embodiment of a bar-code label according to the present invention is applied.

FIG. 1 shows an automotive vehicle body assembly process including painting steps. An automotive vehicle body assembly line includes a line 100 for assembling an engine compartment assembly 102, which line will be referred to hereafter as "engine compartment assembly line", a line 200 for assembling a vehicle floor assembly 202 to the engine compartment assembly 102, which line 200 will be referred to hereafter as "floor assembly line", a line 300 for assembling a body assembly 302 to the floor assembly 202, which line 300 will be referred to hereafter as "body assembly line", a line 400 for completing a vehicle body by mounting doors, fenders and so forth, which line 400 will be referred to hereafter as "metal line", and a line 500 for painting the assembled vehicle body, which line 500 will be referred to hereafter as "painting line". As apparent from FIG. 1, the floor assembly line 200 is associated with a sub-assembly station 204 for preparing a rear floor assembly 206 as a sub-assembly. The rear floor assemblies 206 prepared in the rear floor sub-assembly station 204 is sorted in a storage area (not shown) and picked up and supplied to a floor main station 208 for assembling the rear floor assembly 206 and a front floor 210 and side members 212 to the engine compartment assembly 102 from the engine compartment assembly line 100. An extra welding station 214 following the floor main station 208 performs additional welding operations on the floor assembly 202.

The body assembly line 300 includes a body main station 304, a body side sub-assembly station 306 associated with the body main station 304, and an extra welding station 308. The body side sub-assembly station 306 prepares body side sub-assemblies 310. The body side subassemblies 310 prepared at the body side sub-assembly station 306 are sorted into a storage area (not shown). Likewise, roof sub-assembly station 312 is associated with the body main station 304 for preparing roof panel sub-assemblies 314.

Figure 13:
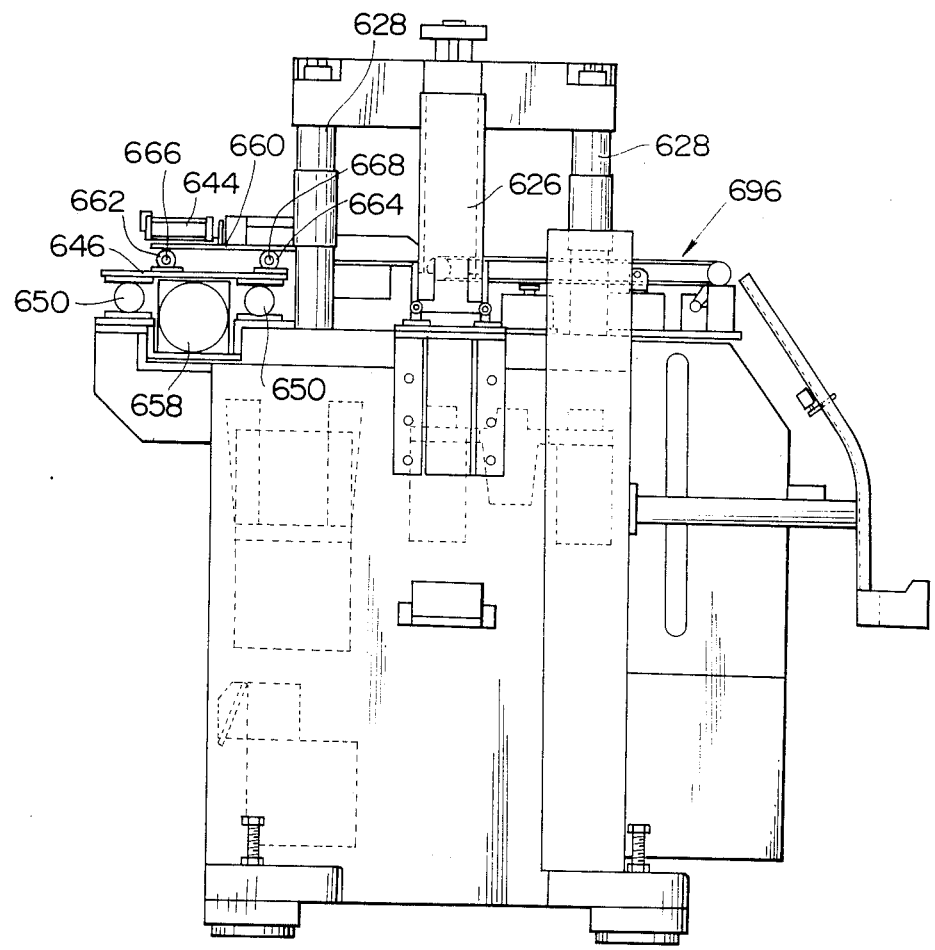
FIG. 13 is a side elevation of the preferred embodiment of bar-code encoding device of FIG. 12.

The painting line 500 includes a preparation station 502 at which washing, surfacing and so forth are performed, an electro-deposition primer coat station 504, an intermediate coat station 506, a sealing station 508, a stone-guard station 510, a sealing oven 512, an undercoat station 514, a intermediate coat polishing station 516, a final coat station 518, a polishing station 520 and a wax booth 522. The engine compartment assembly line 100, the floor assembly line 200, the body assembly line 300, the metal line 400 and the painting line 500 are connected serially in the given order by a per se well-known transportation system, such as a transporting conveyor, a transporting lift and so forth. Between the engine compartment line 100 and the floor assembly line 200, a station 600 for preparing a bar-code label 602 which will be described in detail later, and for attaching the prepared bar-code label to the engine compartment assembly 102. In the preferred embodiment, the bar-code label 602 hangs from a front wheel house 104 of the engine compartment assembly 102. Between the body assembly line 300 and the metal line 400 lies a station 700 for applying a body production number to an appropriate point on the body assembly 302. The manner of application of the body production number and device therefor has been disclosed in the U.S. Pat. No. 4,332,012, especially in FIGS. 13 to 15 thereof. The disclosure of the U.S. Pat. No. 4,332,012 is hereby incorporated by reference for the purpose of the disclosure. Between the body assembly line 300 and the metal line 400 lies another station 800 for applying color marks to the body assembly 302 for identifying which components are to be assembled to the body assembly in the metal line.

The components assembled in each of the engine compartment assembly line 100, the floor assembly line 200, the body assembly line 300 and the metal line 400 will be briefly described below with reference to FIGS. 2 to 5.

Figure 2:
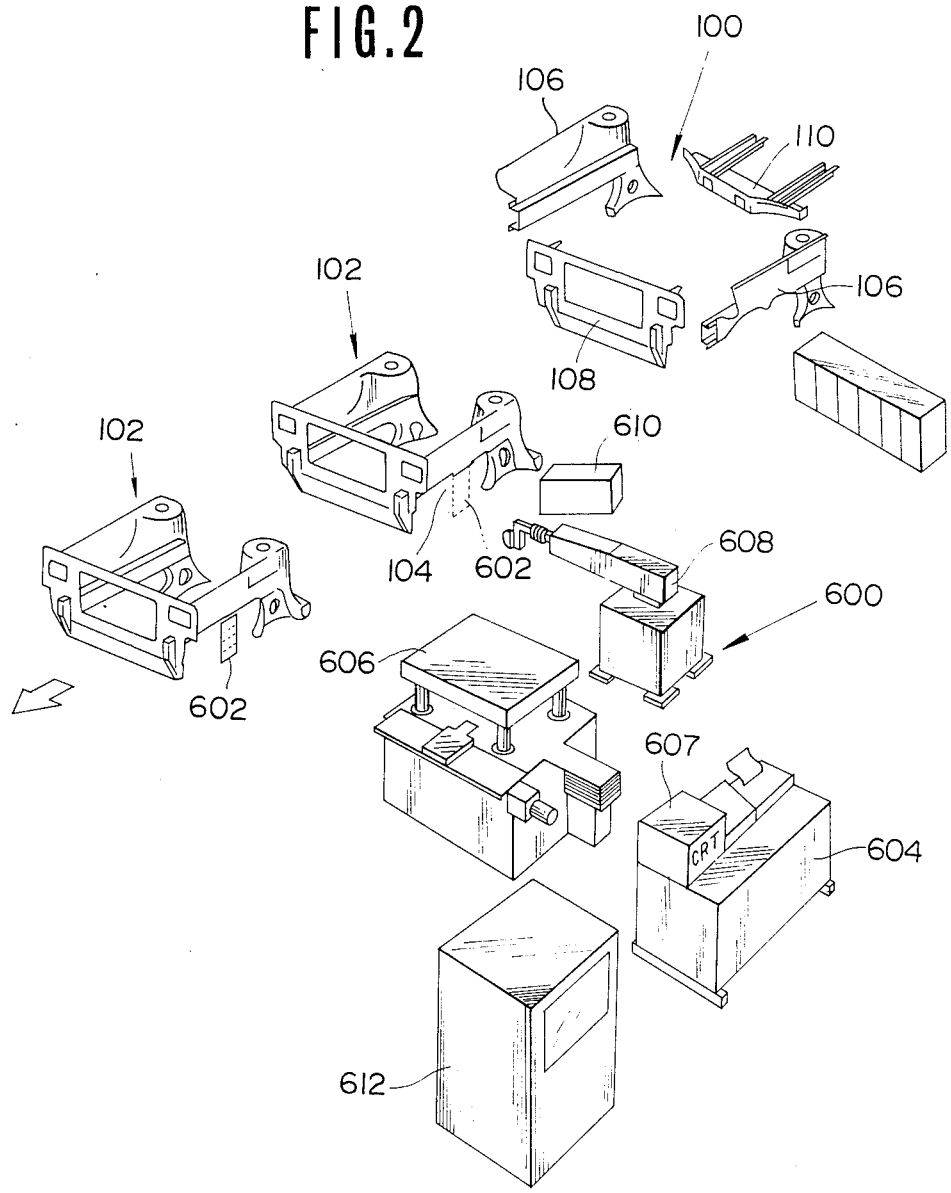
FIG. 2 is a fragmentary illustration of an engine compartment line in the vehicle body manufacturing process with which the preferred embodiment of a bar-code encoding device according to the present invention is associated.

As shown in FIG. 2, the engine compartment assembly line 100 assembles the engine compartment assembly 102 with hood ridges 106, a radiator core support 108 and a cross-member 110. The hood ridges 106 defines the front wheel house 104. The bar-code station 600 is located downstream of the engine compartment assembly line 100. The bar-code station generally comprises a controller 604 including a CRT display 607, a punch press 606 for preparing the bar-code label 602, a robot 608 for attaching the prepared bar-code label 602 to the engine compartment assembly 102, and a bar-code reader 610 for reading data from the bar-code label 602 and feeding back the read data to the controller for confirmation. The controller 604 is connected to a master controller 612 which holds data relating to models, types and specifications of the vehicle bodies to be assembled. According to the production plan, the data about the vehicles are transferred to the controller 604. According to the data input from the master controller, the controller 604 controls the operation of the punch press 606 serving as a bar-code encoding device for preparing the bar-code label 602 containing the data corresponding to that supplied by the master controller.

Figure 7:
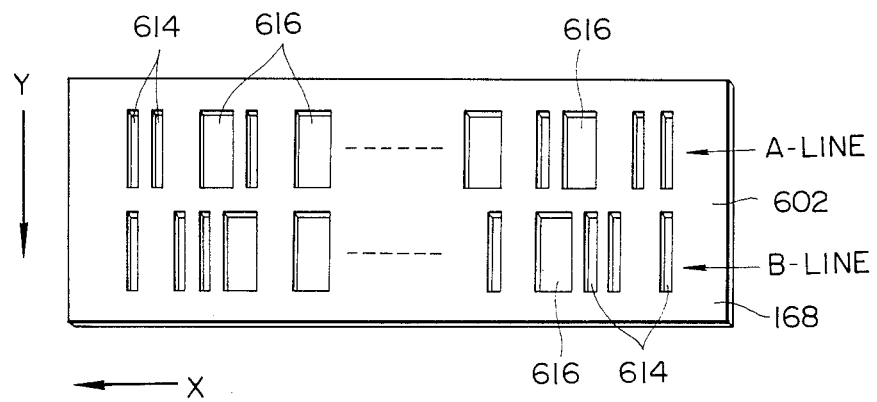
FIG. 7 is a perspective illustration of the preferred embodiment of the bar-code label according to the present invention.
Figure 8:
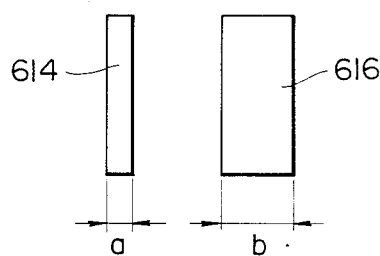
FIG. 8 is an illustration showing the wider and narrower slots formed in the bar-code label.

The bar-code formed in the bar-code label 602 consists of a combination of narrower slots 614 and wider slots 616, as shown in FIG. 7. As shown in FIG. 8, the narrower slot 614 has a width a and the wider slot 616 has a width b. In general, the narrower slot 614 is representative of digital value "0" and the wider slot 616 is representative of digital value "1". The overall bar code on the bar-code label 602 is representative of a digital value indicative of and corresponding to the data from the master controller.

The principle point of and the essential feature of the invention is to facilitate use of the bar-code label 602 of FIG. 7, in which the slots 614 and 616 are formed with rectangular openings with the foregoing specific width.

In the shown application of the bar-code control system for the vehicle body assembling, the bar-code label 602 includes two sequences of aligned slots, each sequence having sixteen slots representing sixteen binary digits.

The bar-code reader 610 comprises a laser-scanner, for example, for optically reading the content of bar-code on the bar-code label 602. The same or similar bar-code readers may be provided at each assembly line or station to read the bar code and obtain data relating to the components which must be assembled and the required assembly operations.

As set forth above, the engine compartment assembly 102 with the bar-code label 602 is transferred to the floor assembly line 200. In the floor assembly line 200, the front floor assembly 210 and the rear floor assembly 206 are assembled to the engine compartment assembly 102 to form the floor assembly 202. The floor assembly 202 is transferred to the body assembly line 300 so that the body side members 310 and the roof panel 314 may be added to form the body assembly. In the metal line 400, side doors 404, front fenders 406 and back doors 408 are attached to the body assembly to complete the vehicle body assembly. In the shown example, the vehicle body being assembled is a two-door, hatch-back-type vehicle. Although a specific type of vehicle body assembly and corresponding components are described here, the vehicle body assembly line will assemble not only the shown type of vehicle but also other types of vehicles, such as sedans, coupes and so forth.

Figure 3:
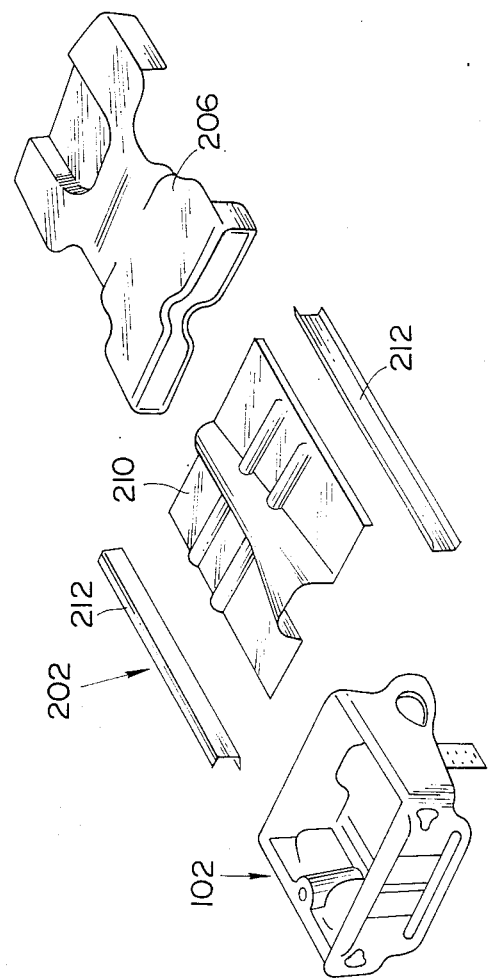
FIG. 3 is a fragmentary illustration of a vehicle body floor to be assembled in a floor assembly line in the vehicle body manufacturing process of FIG. 1.
Figure 4:
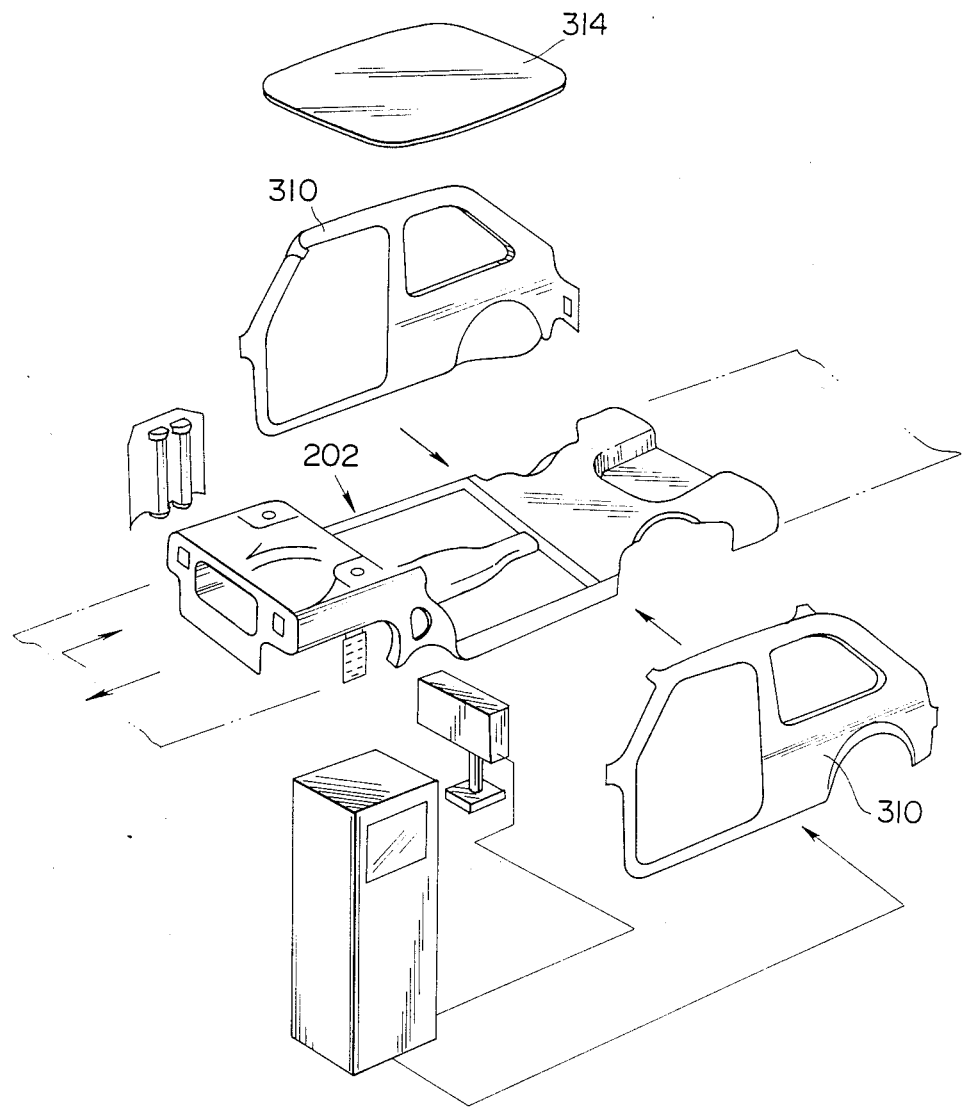
FIG. 4 is a fragmentary illustration of a body assembly line in the vehicle body manufacturing process of FIG. 1.
Figure 5:
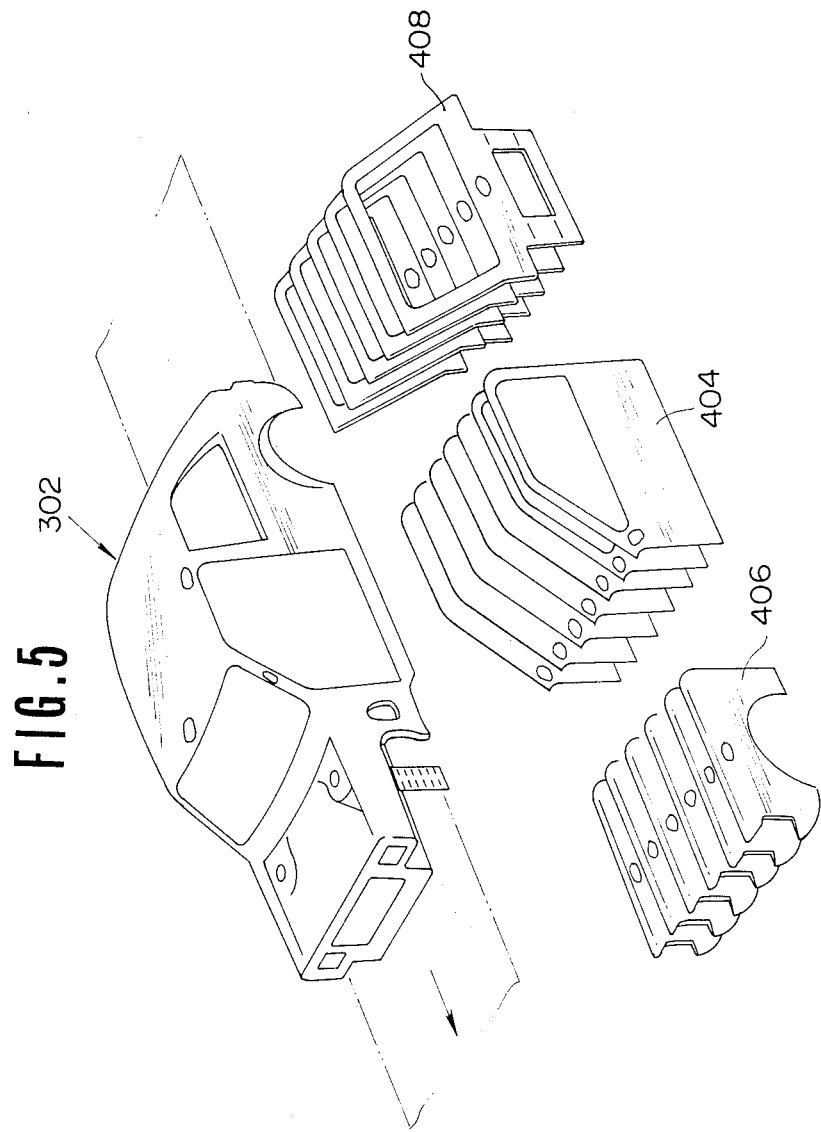
FIG. 5 is a fragmentary illustration of elements used in a metal line in the vehicle body manufacturing process of FIG. 1.

As seen in FIGS. 3 to 5, each assembly line has a bar-code reader and controller controlling selection of components to be assembled and other line operations. Each controller may be a digital processor for processing the read digital data and controlling selection of the components and assembling operations.

Figure 6:
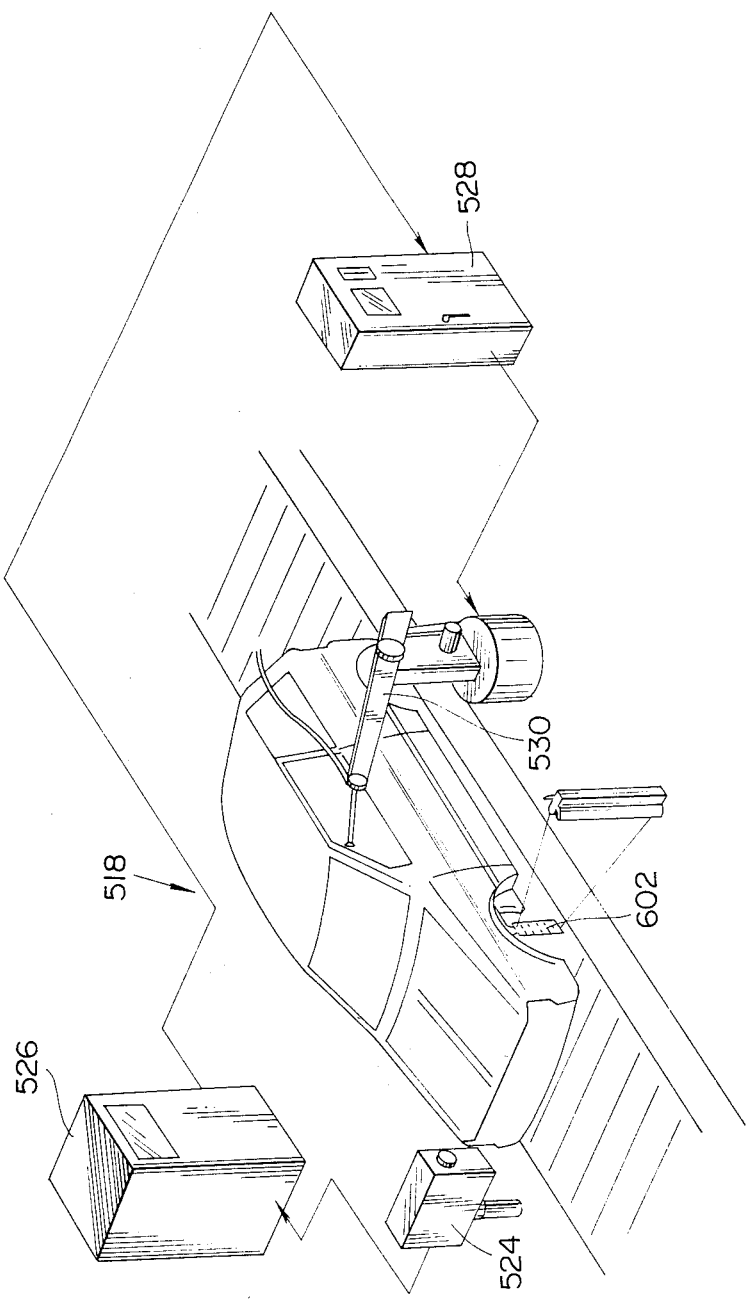
FIG. 6 is a fragmentary illustration of a finishing station in the painting line of FIG. 1.

The assembled vehicle body assembly is transferred to the painting line 500 via the transporting system. FIG. 6 shows part of the final coat station 518. Even after the several steps of the painting line preceding the final coating process, the bar-code label 602 attached to the vehicle body assembly is still fully effective for controlling the operation of the final coating process. The data contained in the bar code of the bar-code label 602 identifies the body color to be painted.

For example, in the shown arrangement of the painting line 500, a bar-code reader 524 is installed at the final coat station 518 to optically obtain the data encoded in the bar-code label 602. The bar-code reader 524 feeds digital signals representative of the read bar-code data to a controller 526. On the basis of the data input from the bar-code reader 524, the controller 526 judges which body color the vehicle should be painted. The controller 526 outputs a control signal to a robot operator 528. The robot operator 528 controls a specific painting robot 530 according to the specific color of paint.

As apparent from FIGS. 4 and 6, the bar-code reader may comprise a light emitter and photo-sensor, instead of the laser scanner employed in the bar-code station in the previous example.

Referring again to FIGS. 7 to 9, the bar-code label 602 is formed by a rigid generally rectangular sheet. In the preferred embodiment, the bar-code label 602 is formed from a thin metal sheet 618. In the metal sheet 618, a combination of wider slots 616 representative of binary number "1" and narrower slots 614 representative of binary number "0" is encoded to correspond to data identifying the model, type and specifications of the vehicle to be assembled. As can be seen in FIG. 7, the bar-code slots are organized into a plurality of groups each representing information about different items such as identification of the assembled components, required operations, body color, body production number and so forth.

In the shown embodiment, the slots are formed in the metal sheet 168 in two parallel, longitudinal rows each containing sixteen bits of data. The ratio of the width of the narrower slot viz-a-viz the wider slot is about 1:2.8-3.

The slots are formed by the punch press 606, which is adapted to punch the wider slots 616 of the first row of slots (hereafter referred to as "slot line A") before punching the narrower slots. After all of the wider slots 616 are punched, the narrower slots 614 in the slot line A are punched. After completing punching operation for the slot line A, then, the narrower slots of the second row of slots (hereafter referred to as "slot line B") are punched before punching the wider slots of the slot line B. After all of the narrower slots are punched, the wider slots of the slot line B are punched.

This slot-punching operation is carried out by the punch press 606 which will be described in detail with reference to FIGS. 10 to 16.

The punch press 606 serving as the bar-code encoding device generally comprises a gripper 620 for manipulating the metal sheet and a pair of punches 622 and 624. The punch 622 is adapted to form the wider slots 616 and the punch 624 is adapted to form the narrower slots 614. The punches 622 and 624 are mounted on a movable frame or ram 626 movable along a pair of supports 628 by a driver unit 630 (not shown). The movable frame 626 is thus movable vertically to form slots by means of the punches by moving down forcefully. As both of the punches 622 and 624 are mounted on the common frame, they are moved down simultaneously eachtime the slot-punching operation is carried out.

Figure 11:
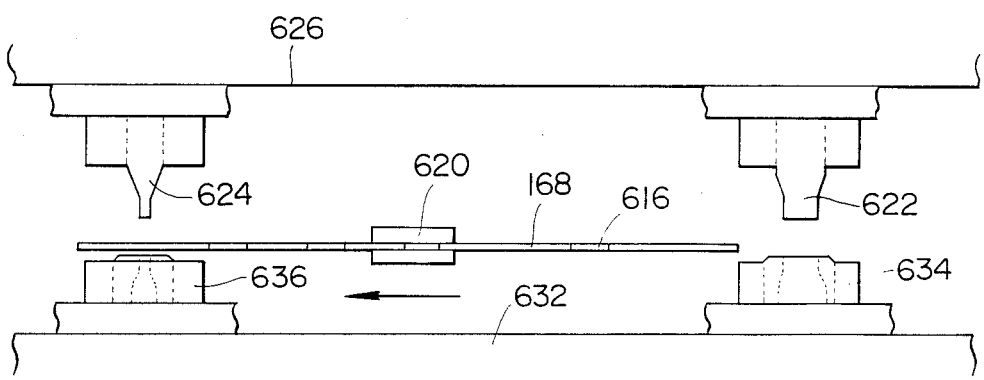
FIG. 11 is an elevation of the punches used to form the wider and narrower slots of the label.

As can be seen in FIG. 11, the punches 622 and 624 are mounted on the movable frame with a fixed separation between them. The distance between the punches 622 and 624 is greater than the length of the metal sheet 618 so that only one of the punches faces the metal sheet at a time.

The movable frame 626 and the punches 622 and 624 can be driven by the driver unit 630 toward and away from a die base 632 with female dies 634 and 636 corresponding to the punches 622 and 624 respectively. The die base 632 and the dies 634 and 636 are fixed to the support frame 638 of the punch press.

The gripper 620 is associated with an electrically controlled actuator 640 operable between a gripping position and a releasing position. The gripper 620 is supported by a laterally movable arm 642 which is associated with an electrically controlled actuator 644. The actuator 644 is mounted on a sliding table 646. A pair of guide brackets 648 extend downward from the lower surface of the sliding table and slidingly engage guide shafts 650, such as ball-spline shafts, which are secured to the support frame at both ends to define the path of the sliding table.

A center bracket 652 has an circular opening 654 with a threaded inner periphery. The center bracket extends from the lower surface of the sliding table 646 between the guide brackets 648. The center bracket 652 engages a threaded drive shaft 656 extending parallel to the guide shafts 650. The drive shaft 656 is associated with a driver motor 658, such as a step motor which may be controlled via an electrical control signal. By means of the driver motor 658, the drive shaft 656 is rotated to drive the sliding table 646 along its path.

Figure 12:
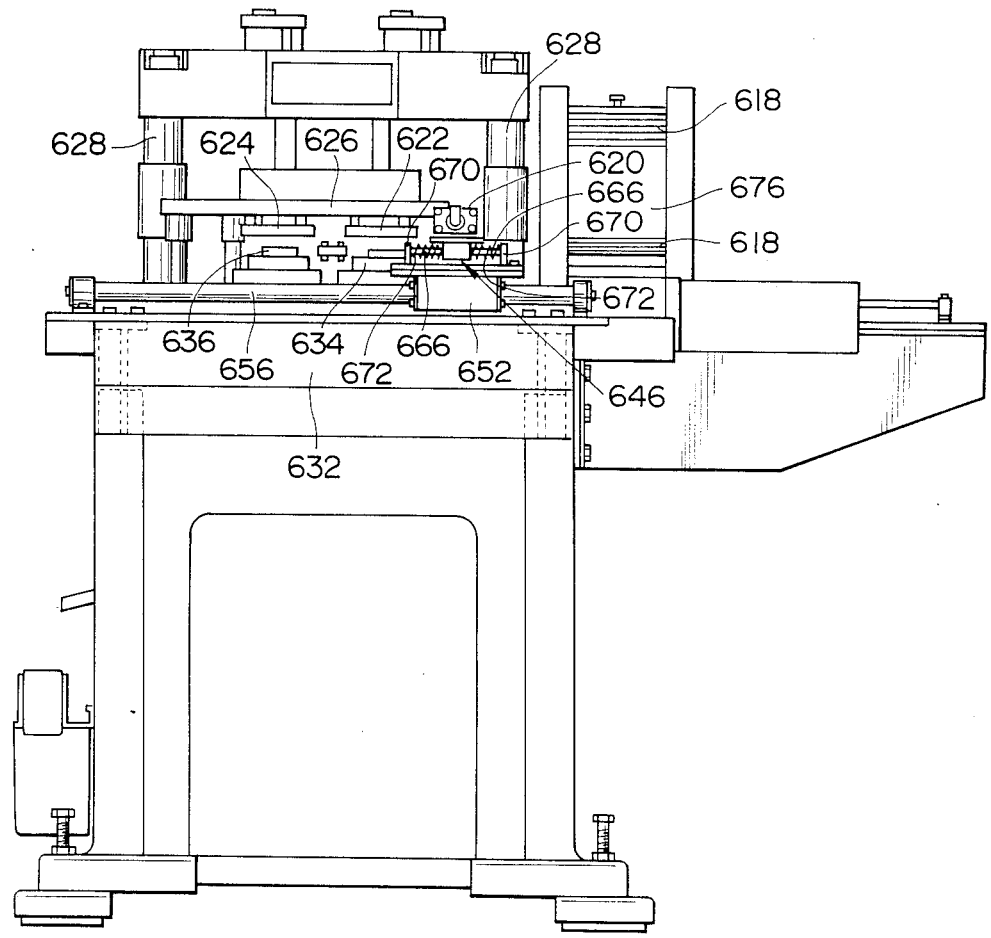
FIG. 12 is a front elevation of the preferred embodiment of the bar-code encoding device according to the present invention.
Figure 14:
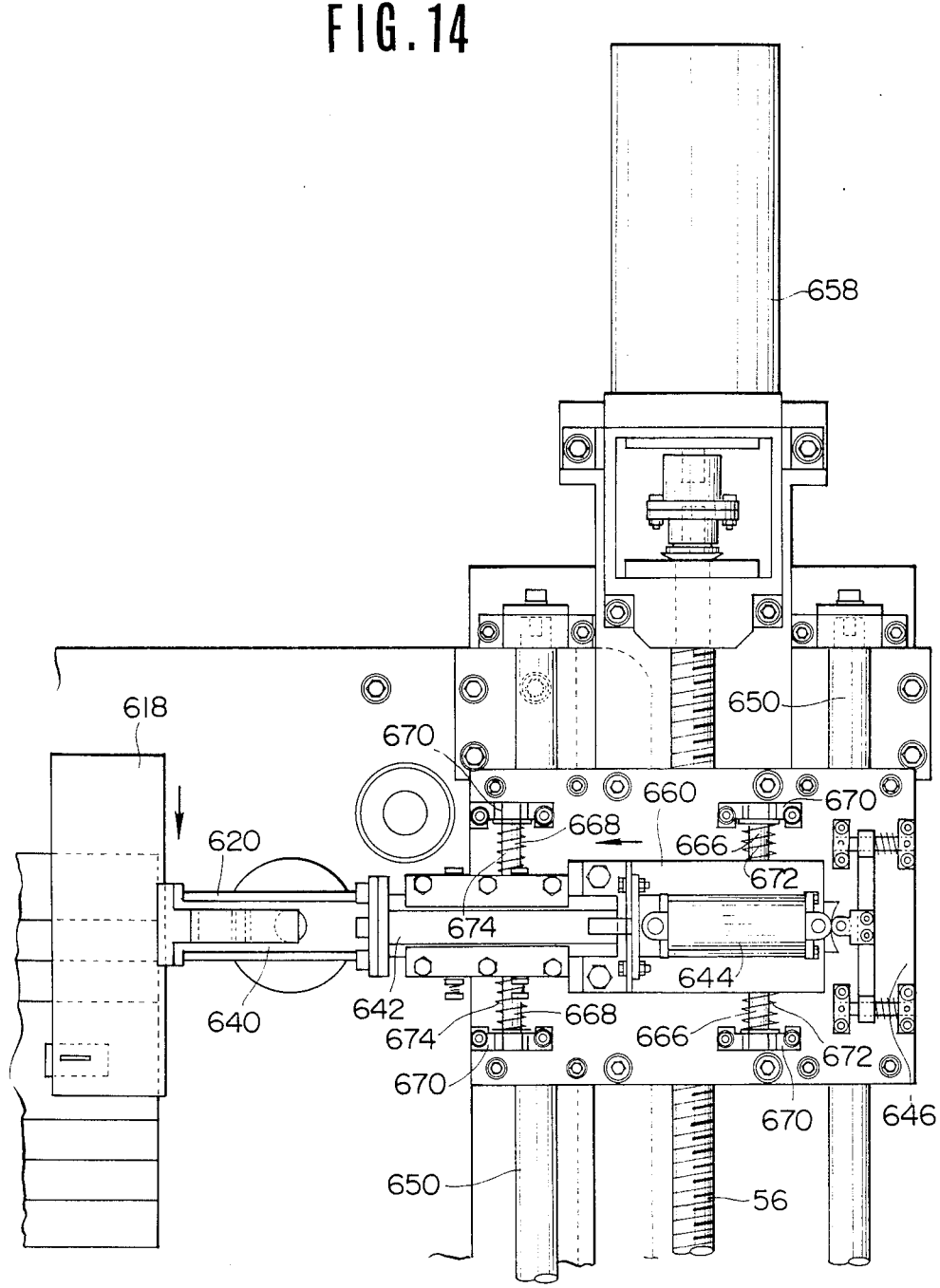
FIG. 14 is an enlarged plan view of the bar-code encoding device of FIG. 12.
Figure 15:
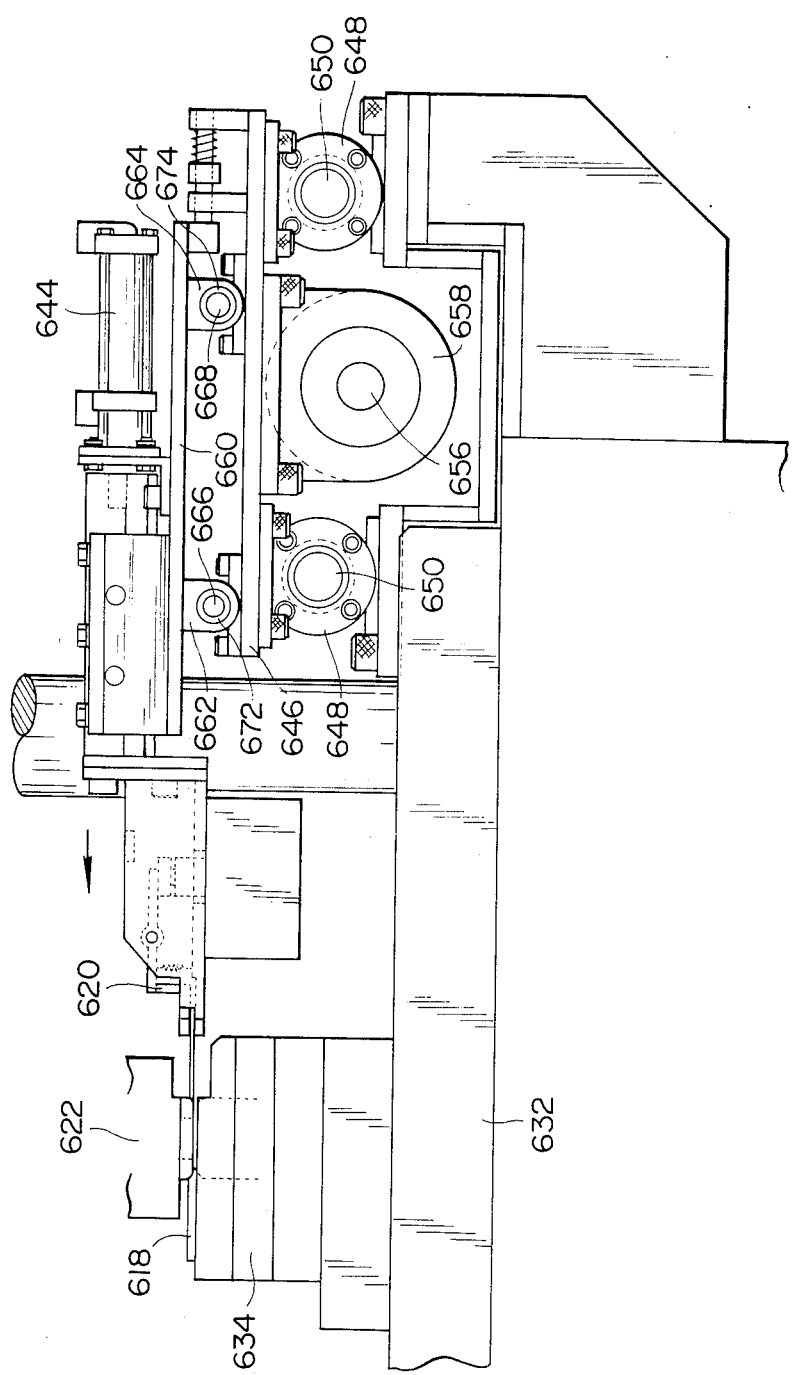
FIG. 15 is a side elevation of the bar-code encoding device as viewed along the arrow in FIG. 14.
Figure 16:
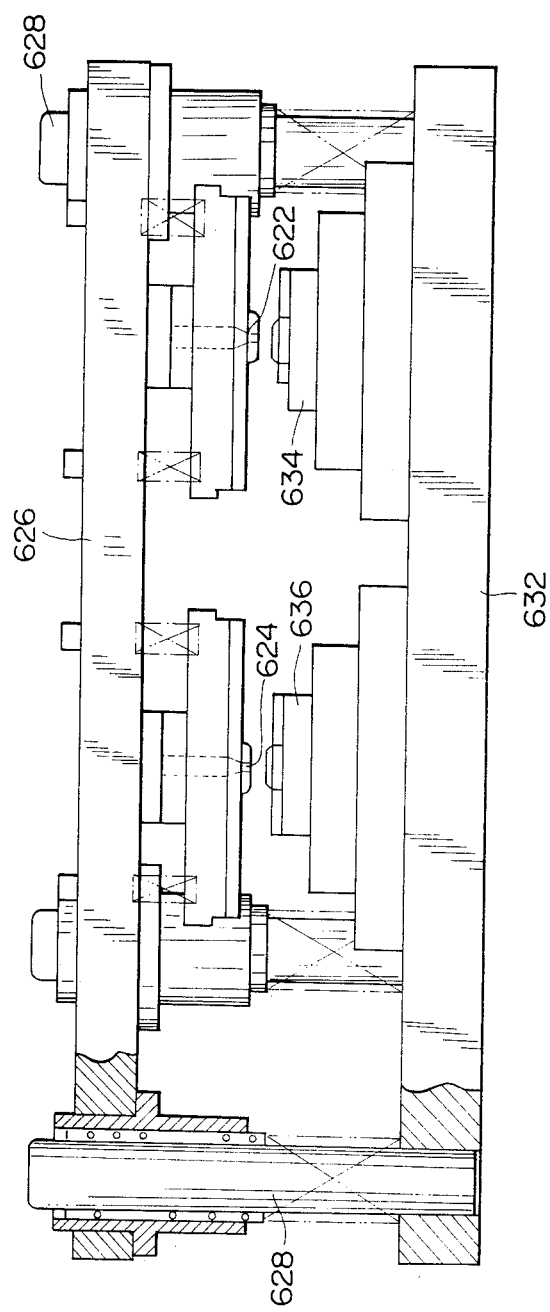
FIG. 16 is an illustration of punches mounted on a single common ram.

As can be seen in FIGS. 12 and 14, an actuator base 660 on which the actuator 644 is mounted has a pair of brackets 662 and 664 extending downward from its lower surface. A pair of laterally extending support rods 666 and 668 pass through the brackets 662 and 664 for movably supporting the actuator base. The support rods 666 and 668 are secured to the sliding table 646 by means of brackets 670. A pair of coil springs 672 wound around the support rod 666 on both sides of the bracket 662 exert equal compressive forces on the bracket in order to center the actuator base 660 in its normal position. Likewise, a pair of coil springs 674 are wound around the support rod 668 on both sides of the bracket 664. The coil springs 674 cooperate the coil springs 672 to hold or return the actuator base 660 to its normal position. Accordingly, the coil springs 672 and 674 have spring constants adequately high to retain the actuator base 660 in its normal position during the slot-forming operation.

The actuator base 660 is thus movable perpendicular to the laterally movable arm 642 when an extraordinarily large load is applied to the gripper overcoming the biasing force of the springs 672 and 674. This movement of the actuator base 660 satisfactorily and successfully absorbs excessive loads applied to the gripper to prevent the device from being damaged due to overstress.

As shown in FIG. 12, the blank metal sheets 618 are stocked in a magazine 676 provided in the punch press. The magazine 676 is associated with a sheet feeder 696 (FIG. 17) for isolating one of the stored blank sheets and for transferring the blank sheet to a position from which the gripper 620 can grip the blank sheet. This position may correspond to the initial position of the gripper 620 to which the gripper is returned after every bar-code encoding operation.

Figure 9:
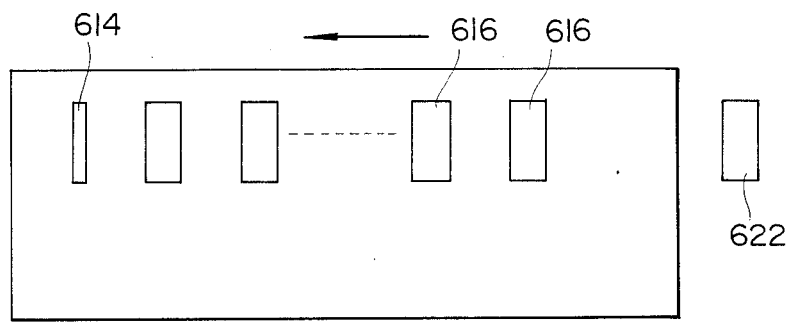
FIG. 9 is an illustration of the bar-code label of FIG. 7 for description of the order of slots in the preferred method for encoding the bar-code.
Figure 10:
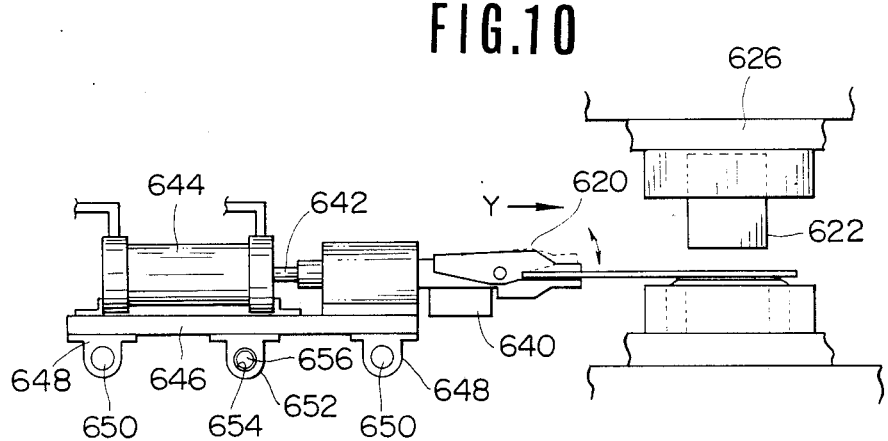
FIG. 10 is a front elevation of part of the preferred embodiment of the bar-code encoding device of the invention for clarifying the order of formation of the bar-code slots in co-operation with FIG. 9.
Figure 17:
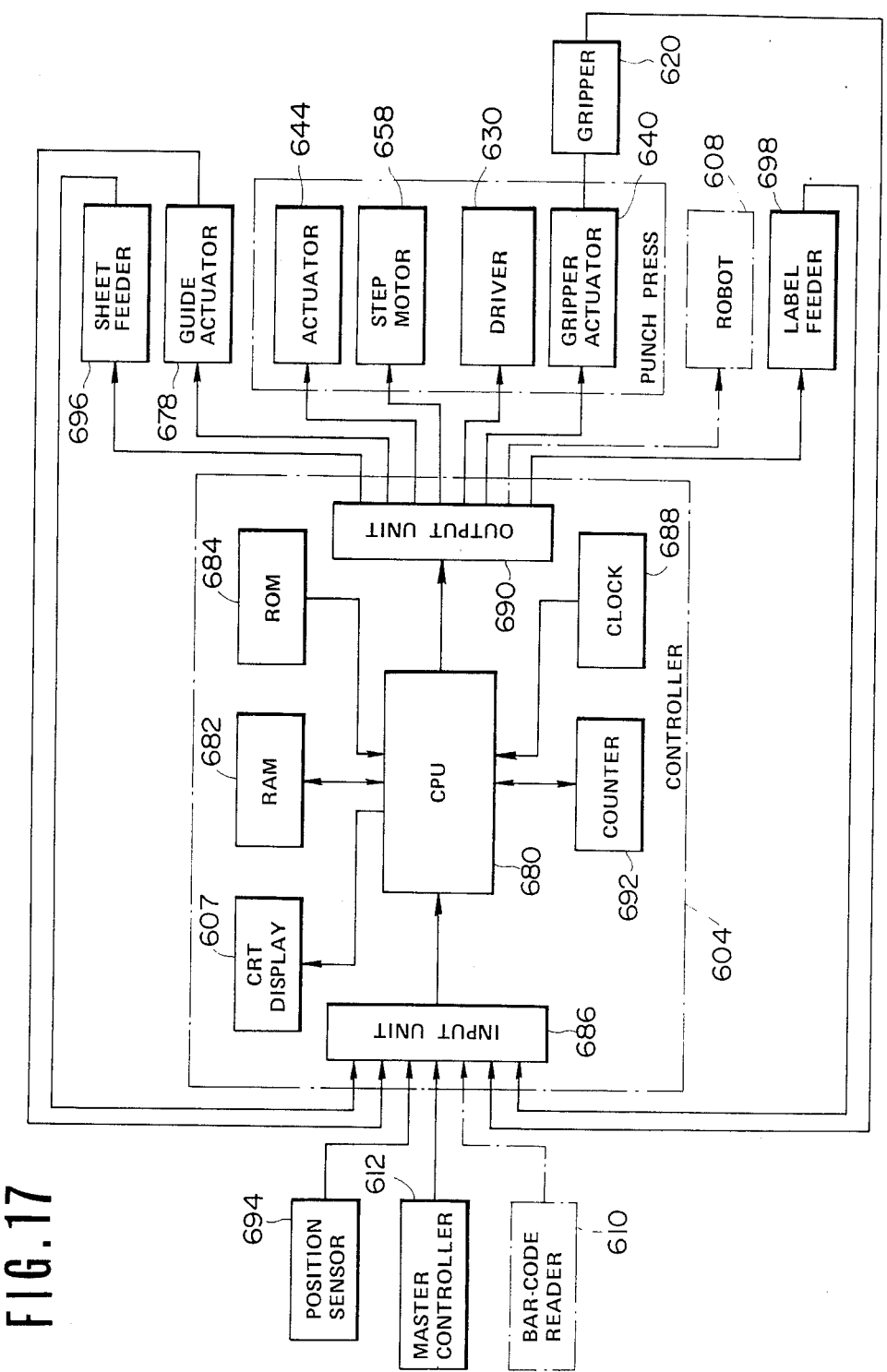
FIG. 17 is a schematic block diagram of the preferred embodiment of a control system for controlling the bar-code encoding operation performed by the foregoing bar-code encoding device.
Figure 18A:
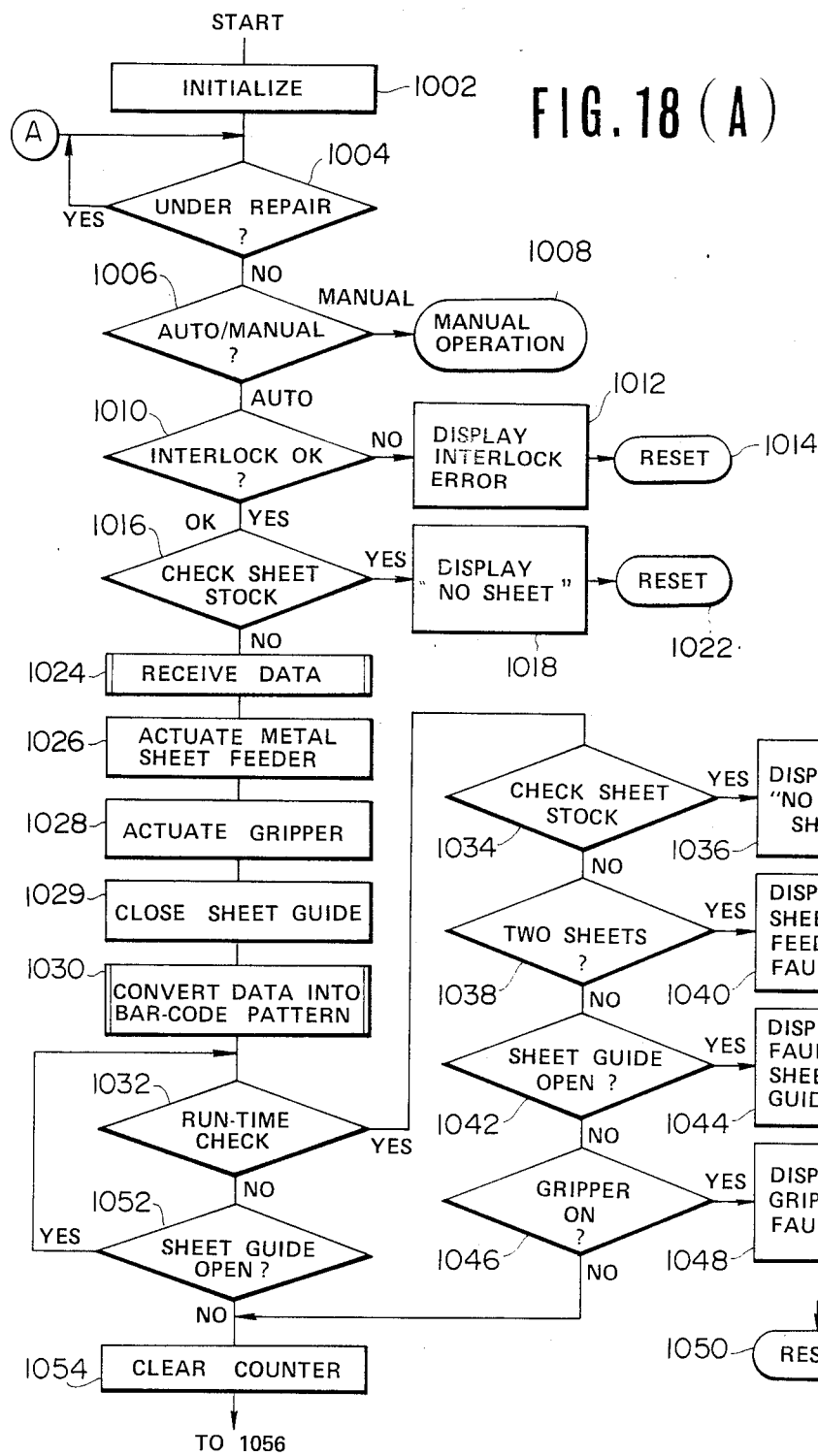
Figure 18B:
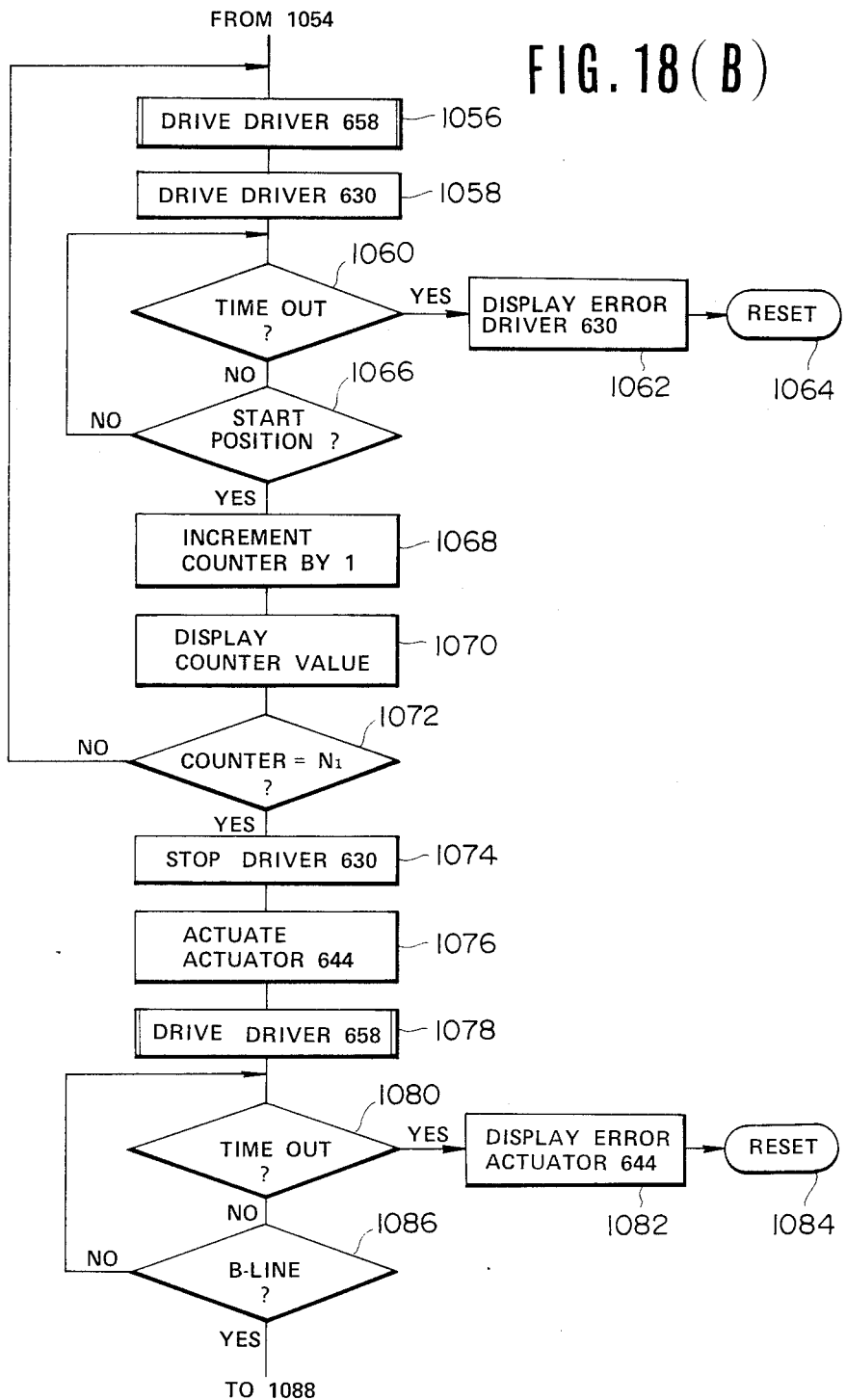
Figure 18E:
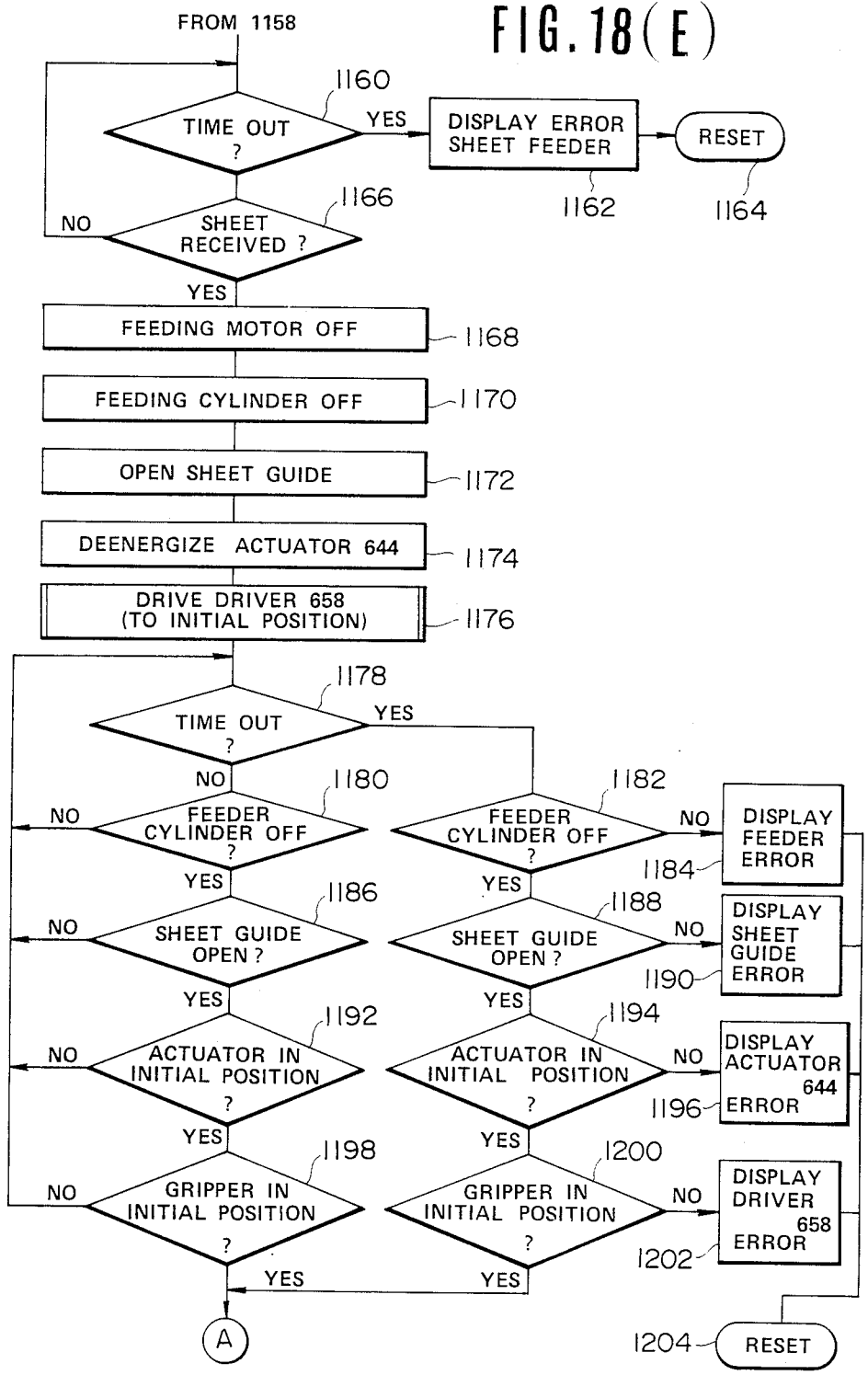

FIG. 17 shows a control system for the punch press 606 for encoding the bar code in the metal sheet 618. As set forth above, the punch press 606 includes the actuator 644 for moving the gripper 620 along the Y-axis, as seen in FIGS. 9 and 10. The punch press 606 also includes the step motor 658 which drives the sliding table 646 via the drive shaft 656 to move the gripper 620 along the X-axis. The gripper 620 is actuated between its gripping and releasing positions by the gripper actuator 640. The driver unit 630 is associated with the movable frame 628 for moving the punches 622 and 624 toward and away from the female dies 634 and 636.

In the punch press, a guide (not shown) is provided for guiding the metal sheets from the magazine 676. The guide is movable to by a guide actuator 678 to open and close the metal sheet path. When the sheet metal path is open, the sheet feed 696 can convey a single sheet to the initial position of gripper 620. After the encoding process, the gripper 620 releases the encoded label 602, which is then conveyed to the attachment robot 608 by a label feeder 698.

The operation of the Y-axis actuator 644, the step motor 658, the gripper actuator 640, the punch driver unit 630 and guide actuator 678 are controlled by control signals from the controller 604. As shown in FIG. 17, the controller 604 comprises a digital processor, such as microcomputer, including CPU 680, RAM 682, ROM 684, an input unit 686, a clock generator 688, an output unit 690 a counter 692 and the CRT display 607. The counter 692 may be incorporated as part of RAM 682 practically, but in the drawing, it has been illustrated separately from RAM for clear understanding.

The master controller 612 is connected to the input unit 686 of the controller 604 to transfer data relating to models, types and specifications of vehicle bodies to be assembled according to the production plan. A position sensor 694 detects the sheet or gripper position along the X-axis and outputs a position signal to the input unit of the controller. Also, the bar-code reader 610 reads the bar code encoded in the bar-code label attached to the vehicle body at the end of the encoding operation. The CRT display 607 may be used to display the data to be encoded into the bar-code label.

The output unit 690 is connected for control output to the guide actuator 678, the sheet feeder 696, the label feeder 698, the Y-axis actuator 644, the step motor 658, the punch driver 630 and the gripper actuator 640. The output unit 690 is also connected to the robot 608 adapted to attach the encoded bar-code label onto the engine compartment assembly. The gripper actuator 640 or the gripper 620 is connected to the input unit to return a feedback signal to the controller.

Figure 19:
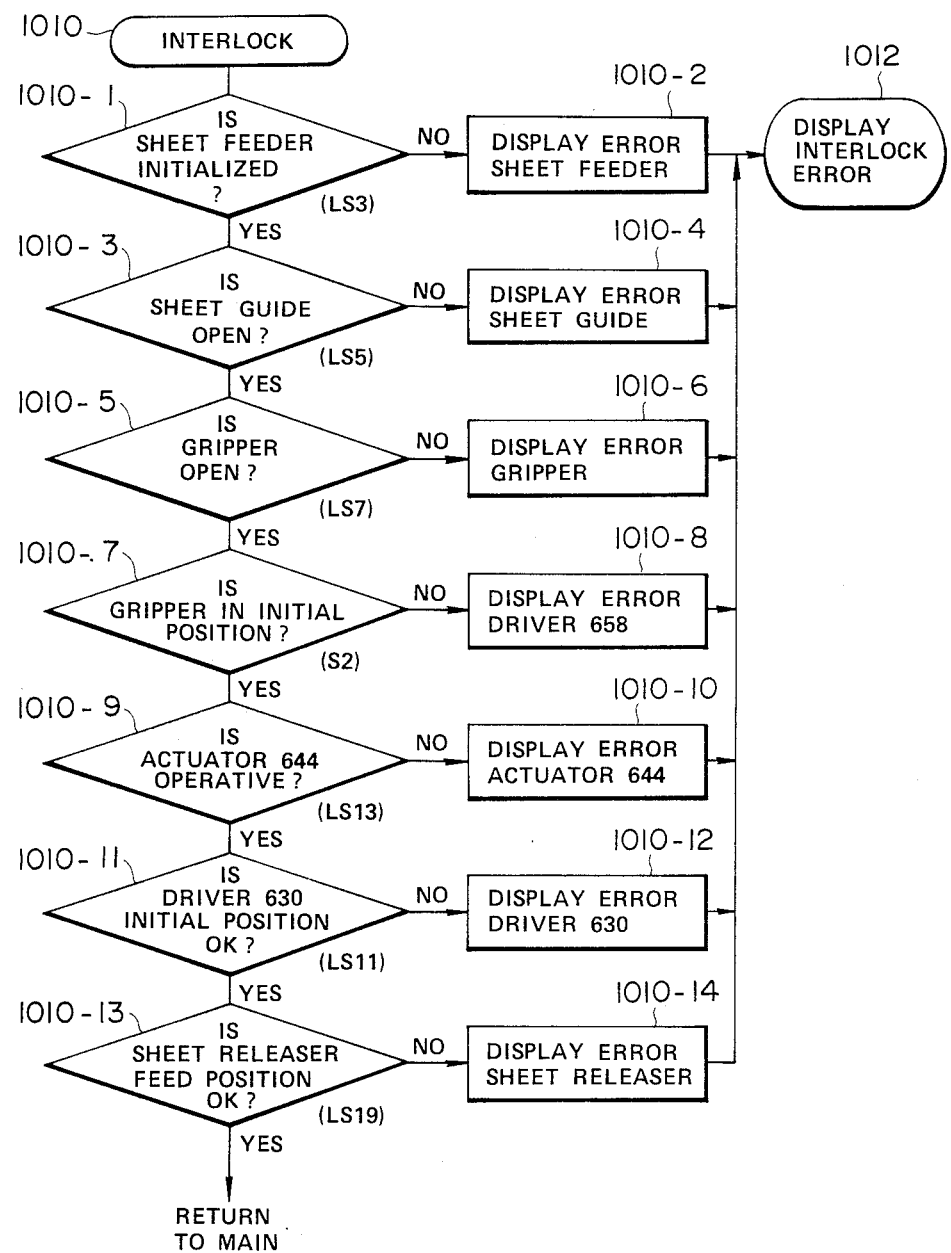

The control system with the foregoing structure, according to the preferred embodiment performs the bar-code encoding operation according to a control program which will be described in detail with reference to FIGS. 18(A) to 18(E) and FIGS. 19 to 22. FIGS. 18(A) to 18(E) together form a flow chart of the punch press control program and FIGS. 19, 20 and 22 show sub-routines for the main program of FIGS. 18(A) to 18(E).

At the initial stage of execution of the control program, after START, the entire system is returned to its initial state in a step 1002. After initialization at the step 1002, the system is checked to see if it is ready to perform the bar-code encoding operation, at steps 1004 to 1022. First the program checks whether the system or the punch press is under repair at the step 1004. If so and thus the answer is YES, then program execution is halted until the repair operation is finished. If the answer is NO, then the program checks whether the system operation mode is AUTO or MANUAL, at step 1006. If the MANUAL mode is selected, then program execution moves to the manual operation state at step 1008 and then terminates. When the answer at the step 1006 is AUTO, then, the interlock condition of the punch press 606 is checked at step 1010. This step 1010 executes as a the sub-routine shown in FIG. 19.

Upon entering the interlock sub-routine, the routine checks at step 1010-1 whether the sheet feeder 696 is in its initial position. If NO, the display 607 is activated to indicate malfunction of the sheet feeder at step 1010-2. If the sheet feeder is in its initial position when checked at the step 1010-1, then, at step 1010-3, the sheet guide is checked for whether it is open. If the sheet guide is in its closed position, malfunction of the sheet guide is indicated on the display 607 at step 1010-4. Otherwise, i.e. when the sheet guide is open, the gripper 620 is checked at step 1010-5 for whether it is open. If the gripper 620 is closed, then the gripper error is indicated on the display 607 at step 1010-6. If the gripper is closed, then the X-position of the gripper is checked at step 1010-7. If the gripper is not in its initial X-position due to failure of driver 658, then the driver failure is displayed; otherwise control proceeds to step 1010-9. If the gripper position along the Y-axis corresponds to the inoperative condition of the actuator, then control proceeds to step 1010-10 in which the failure of the actuator 644 is displayed. Otherwise, the actuator 644 is judged to be operative, and so the routine proceeds to check punch position at step 1010-11. If the punches are in their initial positions, the answer at the step 1010-11 is YES and otherwise NO. If NO, failure of driver 630 is displayed at step 1010-12. On the other hand, when the punches are in their initial positions, the sheet releaser 698 is checked to see whether it is in a lowered inoperative position, at step 1010-13. If the sheet releaser 698 is not in the inoperative position, malfunction of the sheet releaser is displayed at step 1010-14.

When the sheet feeder 696, the sheet guide, the gripper 620, the gripper position with respect to both of the X- and Y-axes, the punch positions and the sheet releaser 698 are all OK, then the answer at the step 1010 is OK and then program execution returns to step 1016 of the main program. On the other hand, if one of the foregoing is not OK, then INTERLOCK ERROR is displayed at step 1012 and the system is reset at step 1014.

When the interlock is OK as judged at the step 1010, then the sheet magazine 676 is checked to see whether sheets are available. If not, NO SHEET is displayed at step 1018 and then the system is reset at step 1022.

When all the check items are OK, then the input interface is prepared for receiving data from the master controller 612. The data from the master controller 612 is received at step 1024. The received data from the master controller 612 is temporarily stored in RAM 682 or an appropriate register in the controller 604. At step 1026, the sheet feeder 696 is actuated. The gripper is actuated to clamp the sheet from the magazine in step 1028 and then the sheet guide is closed again in step 1029. After this, conversion of the received digital data into a corresponding bar-code pattern is performed at step 1030.

In the step 1030, the sub-routine as shown in FIG. 20 is carried out. At step 1030-1 the digital bytes are converted into the corresponding groups of bar-code bits. Then maximum frequency DGSW is read in at step 1030-2, and minimum frequency DGSW is read in at step 1030-3. After this, actuation speed or acceleration characteristics of the step motor 658 are read in at step 1030-4. Then, at step 1030-5, arithmetic operations are carried out to determine drive pattern of the step motor 658 required to form the bar-code derived in step 1030-1. The determined driving pattern of the step motor is set in RAM or appropriate registers in the controller, at step 1030-6.

Figure 21:
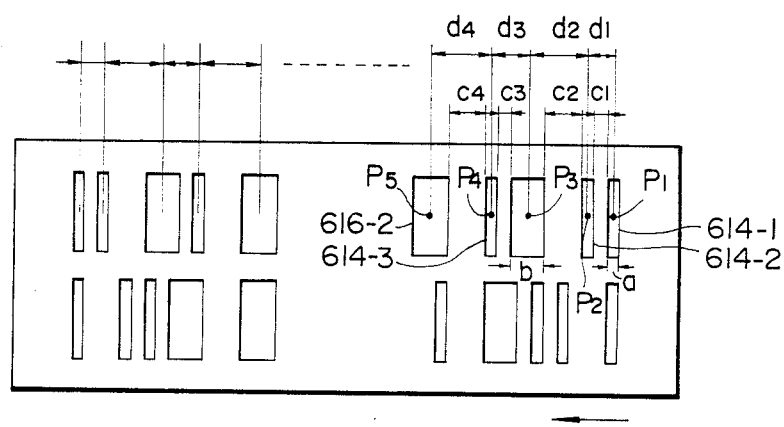
FIG. 21 is an explanatory illustration showing determination of the locations of bar-code slots.

Assume that the bar-code pattern derived from the digital data fed from the master controller is as illustrated in FIG. 21, and that the sliding table 646 is moved along the X-axis at a distance d per each cycle of the step motor 658 and the step motor is driven through one cycle of revolution in response to each input pulse. The arithmetic operations at the step 1030-5 are adapted to determine the sequence of pulse groups to be sent to the stepper motor to move the sliding table 646 such that first the wider slot positions of the A-line pass under the wide punch, the narrower slot positions of A-line pass under the narrow punch, the narrower slot positions of B-line pass under the narrow punch in the opposite order and finally the wider slot positions of B-line pass under the wide punch. Specifically, in the example shown in FIG. 21, the first step would be to move the blank sheet such that the wide punch is centered over the center $P_3$ of the first wider slot, followed by centering over the center $P_5$ of the second wider slot, etc. After the last wider slot, the sheet would be shifted through a distance equal to the spacing between the punches minus the distance between the centers of the last wider and first narrower slots. Thus, given the widths a, b of the narrower and wider slots and inter-slot distances $C_{1-4}$ of FIG. 21, the first number derived in step 1030-5 would be $(c_1+c_2+a/2+a+b/2)/c$ (assuming the initial gripper position is at the point $P_1$), representing the distance to the first wider slot, and the next number would be $(c_3+c_4+a+b)/c$. The same calculations would be performed for the B-line, but starting from the left-hand narrower slot and ending with the right-hand wider slot as seen in FIG. 21.

After the step 1030-6 for storing the data indicative of the driving pattern of the step motor 658, the program execution returns to the main program. Immediately after returning to the main program, the elapsed run-time of the program is checked at step 1032 to see whether the time exceeds a given time limit. If so, the magazine is again checked to see if sheets are available, at step 1034. If there are no sheets left, this fact is displayed on the display at step 1036. If some sheets are present, the gripper 620 is checked to see if it is holding more than one sheet at step 1038. If gripper 620 is gripping more than one sheet, the gripper malfunction is displayed on the display at step 1040. If only one sheet is gripped by the gripper, the sheet guide is checked to see if it remains in its open position at step 1042. If the sheet guide is still open, this error condition is displayed at step 1044. If the sheet guide is closed, the gripper 620 is checked to see if it is in the gripping position; if not, this gripper error is displayed at step 1046. Otherwise, the program execution goes to step 1054 to clear the counter 692. On the other hand, if one of the steps 1036, 1040, 1044 and 1048 is executed, the system is reset at step 1050.

When the result of checking run-time at the step 1032 is NO, then, the sheet guide is checked at step 1052 to see if it is in its open position. If the sheet guide is in its open position, control returns to the step 1032 to check time again. After the sheet guide eventually closes, the counter 692 is cleared for use later at the step 1054.

In the first stage of the bar-code encoding operation for the A-line of slots, the wider slots are formed before the narrower slots. Therefore, in the first stage which lasts until all of the wider slots 616 are formed in the metal sheet, the punch 622 serves only to form slots 616 in the A-line of slots. In the second stage after all the wider slots in the A-line have been formed, then the punch 624 becomes active to form the narrower slots 614 in the A-line.

First, the step motor 658 is driven in step 1056 according to the predetermined driving pattern to move the sheet in order to form the next scheduled slot. As set forth above, in the case of the A-line, the wider slots are formed before the narrower slots. Therefore, in the first state represented by steps 1056–1072, the sheet is moved at the step 1066 in the X-direction under the punch 622 in order to form the next slot 616. At the step 1056 in the first stage, the step motor 658 is operated to move the sheet to the next slot 616 position and, in the second stage, it drives the sheet to the next narrower slot 614 position. In step 1056, a sub-routine shown in FIG. 22 is executed.

Immediately after entering the sub-routine, the stored driving pattern for the step motor is consulted to determine the number n of pulses required to move the sheet to next scheduled position, at step 1056-1. The read pulse number will be held in an appropriate register in the controller. According to the set value, the controller 604 feeds pulses through its output unit 690 to the step motor 658 to drive the latter for the given number of cycles of revolution, one at a time, at step 1056-2. A clock signal from the clock generator 688 is then counted at step 1056-3 in order to measure a period of greater than 40 ms. After time expires, the output of the pulse is stopped at step 1056-4. Thereafter, the counter clock number is cleared at step 1056-5. Then, the position sensor signal is checked against the next scheduled punching position at step 1056-6. If the gripper 620 is at the position at which the next punching operation will be performed, the process returns to main program. Otherwise, execution of sub-routine returns to the step 1056-2.

In the step 1058, the punches 622 and 624 are simultaneously operated so that whichever one of the punches 622 and 624 opposes the metal sheet can form the corresponding wider or narrower slot. After the step 1058, the elapsed time is checked at step 1060. If a predetermined time has elapsed, malfunction of the driver 630 is displayed on the display 607 at step 1062 and then the system is reset at step 1064. If the slot is formed within the given time period and thus timely operation is judged at the step 1060, the sensor signal from the position sensor 694 is read. At step 1066, the gripper 620 position is checked to see whether the gripper is in the position at which the last slot was formed in the sheet in the immediately preceding punching operation. This step is necessary to allow for possible rebound of the sliding table 646 due to the force of the punch press. If positional deviation is detected, process control returns to the step 1060 to check time again until the table 646 settles.

The value of the counter 692 is incremented by 1, at step 1068 and the incremented counter value is displayed at step 1070. At step 1072, the counter value is compared with $N_1$, which is the number of slots to be formed in the A-line. If the counter value is less than $N_1$, the process returns to the step 1056. When the counter value reaches $N_1$, the driver 630 is stopped at step 1074.

Thereafter, the actuator 644 becomes active at step 1076 to move the gripper with the metal sheet in Y-direction in order to shift the metal sheet to the position in which B-line slots can be punched. Thereafter, the step motor 658 is driven to move the sheet to the initial B-line bar-code position, at step 1078. At step 1080, elapsed time is again checked. If time is out at the step 1080, then malfunction of actuator 644 is displayed at step 1082 and subsequently the system is reset at step 1084. If time out is not detected, then the sheet position is checked at step 1086 to judge whether it is in the position for forming B-line slots yet. If not, control returns to the step 1080. Once the sheet is in position for forming B-line slots, then driver 658 is actuated to shift the sheet to the position of the first narrower slot in step 1088 (refer to the subroutine of FIG. 22) and, the actuator 630 is actuated to form the first narrower slot 614 at step 1090.

As set forth above, the B-line bar-code is formed by punching out the narrower slots before the wider slots. Therefore, the initial position of the sheet for the B-line slot punching operation has to correspond to the first narrower slot position of the B-line of the sheet.

After the step 1090, execution time is again checked at step 1092. If time is out at step 1090, malfunction of driver 630 is displayed at step 1094 and the system is reset at step 1096. If time is not out, the sheet position indicated by the position sensor signal is checked at step 1098. If the sensor signal indicates that the position is offset from the scheduled position, control returns to step 1092 to check time again. Otherwise, the counter value of the counter 688 is incremented by 1, at step 1100. At step 1102, the counter value is displayed similarly to the step 1070. In step 1104, the counter value is compared with $N_2$, which is representative of overall number of slots to be formed on the metal sheet. If the counter value is less than $N_2$, control returns to the step 1088. The steps 1088 to 1104 constitute a loop for forming B-line slots. When the counter value checked at the step 1104 reaches $N_2$, time is checked at step 1106. If time is out at the step 1106, then malfunction of the driver 630 is displayed at step 1108. Thereafter, the system is reset at step 1110. If the answer of the step 1106 is NO, i.e., if the driver 630 is still working properly, the movable frame position is checked to see if it has been returned to its uppermost position at step 1112. If not, control returns to the step 1106. After the movable frame reaches its uppermost position, the driver 630 is stopped at step 1114.

Thereafter, the sliding table 646 with the gripper 620 and the bar-code encoded sheet, i.e. the finished bar-code label 602, is returned to the feed position by actuation of the step motor 658 at step 1116. At step 1118, elapsed time is again checked. If time is out, the malfunction of the step motor 658 is displayed at step 1120. Then the system is reset at step 1122. If time has not expired, the position sensor signal is checked to determine whether the gripper is exactly positioned at the feed position, at step 1124. If not, control returns to the step 1118. Otherwise, the label releaser 698 is moved to the feed position at step 1126.

After the step 1126, run time is checked at step 1128. If time is out, malfunction of the label releaser is indicated on the display 607 at step 1130. The system is then reset at step 1132. On the other hand, if the time limit has not been exceeded, the position of the label relaaser is checked at step 1134. If the label releaser is not yet in the receiving position, control returns to the step 1128. After the label releaser has moved to the receiving position, the gripper closing actuator is turned off at step 1135 to allow the finished label to fall onto the sheet releaser. Time is checked at step 1136 in conjunction with a check at step 1139 to see whether the label has been received by the sheet releaser. If the label is not received within a predetermined time, the label release error is displayed at step 1137 and the system is reset at step 1138. If the label is released in good time. Then, the motor for a feeding conveyor 696 becomes operative at step 1140 and a feeding cylinder is turned on at step 1142.

Thereafter, time is again checked at step 1144. When time extends beyond a given period, then malfunction of gripper 620 is displayed at step 1146 and the system is reset at step 1148. If time has not expired, the gripper 620 is checked again to see if it is in the releasing position, i.e., open, at step 1150. If the gripper is still in the gripping position, the process returns to the step 1144 and otherwise proceeds to step 1152, at which time is again checked. If time is out at the step 1152, then, malfunction of sheet conveyor 696 is displayed at step 1154. Thereafter, the system is reset at step 1156. If time is not out at the step 1152, then feeder conveyor is checked to see if it is operative. If the feeder conveyor is inoperative, control loops between the steps 1152 and 1158 until the feeder conveyor becomes operative or time-out is detected. If the feeder conveyor is operative, time is checked at step 1160. If time over is out, malfunction of feed conveyor 696 is indicated on the display 607 at step 1162 and then the system is reset at step 1164. If time is not out, the robot 608 is checked to see if it has received the bar-code label 602 via the feeder conveyor. If the robot has not received the bar-code label, then control returns to 1160 to define a loop between the steps 1160 and 1166 which waits until the robot receives the bar-code label or until time is out. If when the robot receives the bar-code label in time, the label feeder 696 is turned off at the step 1168, the feeding cylinder is deactivated to return the conveyor to its initial, lower position at step 1172, the sheet guide is closed at step 1174, and the pulse motor 658 is driven to return the sliding table with the gripper to its initial position at step 1176.

After the step 1176, time is again checked at step 1178. If time is not out, the feeder cylinder position is checked to see if it has returned to its lower position at step 1180. If it is still operative, control loops between the steps 1178 and 1180 to wait until the feeder cylinder is deactivated fully. When the inoperative position of the feeder cylinder is confirmed at the step 1180, the sheet guide is checked to see if it is open at step 1186. If the result of checking at the step 1186 is NO, control loops through the steps 1178, 1180 and 1186 until the sheet guide is open. After the sheet guide is open the actuator 644 is checked to see if the gripper is in its initial Y-position at step 1192. If the gripper is not in its initial Y-position a loop is established between the steps 1178, 1180, 1186 and 1192 until the gripper is returned to its initial position. After the gripper reaches its initial position, the gripper position with respect to X-axis is checked at step 1198. If initialization of the gripper with respect to X-axis is not completed, control loops through steps 1178, 1180, 1186, 1192 and 1198 until completion of the initialization of the gripper. When the gripper reaches its initial position, control returns to the step 1004 to repeat the bar-code encoding operation.

On the other hand, if time is out when checked at the step 1178, the feeder cylinder position is checked at step 1182, the sheet guide position is checked at step 1188, the gripper Y-position is checked at step 1194 and the gripper X-position is checked at step 1200. The checking operations performed in the steps 1182, 1188, 1194 and 1200 are all identical to those performed in the foregoing steps 1180, 1186, 1192 and 1198 respectively. If all of the checking results in the steps 1182, 1188, 1194 and 1200 are YES, control returns to the step 1004 to repeat the bar-code encoding operation as set forth above.

On the other hand, when the answer at the step 1182 is NO, then malfunction of the feeder cylinder is indicated on the display 607 at step 1184. Similarly, malfunction of the sheet guide, the actuator 644 and the step motor 658 are respectively displayed at steps 1190, 1196 and 1202. After any of these error display steps, the system is reset at step 1204.

In summary of the foregoing control operation, the punch press 606 first forms the wider slots in the A-line at the scheduled positions according to the bar-code pattern derived from data input by the master controller 612. Therefore, at the first stage, the gripper 620 remains aligned under the punch 622 until all of the wider slots 616 are formed. After all of the wider slots 616 in A-line have been formed, then the gripper 620 is moved to the position below the punch 624 to form the narrower slots 614. The gripper 620 is moved along the X-axis according to the determined drive pattern of the step motor to position the sheet at positions corresponding to the determined bar-code pattern.

After the A-line slots have been punched, the actuator 644 is activated to move the gripper along the Y-axis in order to shift the sheet to a position suitable for punching the B-line slots. The narrower B-line slots 614 are formed before the wider slots. The punch 624 is used to form the narrower slots 614 in the B-line. After completion of the narrower slot forming operation, the sheet is transferred in the X-direction to the location in the punch press in which the sheet opposes the punch 622 in order to form the wider slots 616 of the B-line.

When the bar-code encoding operation is finished, the bar-code label is fed to the robot 608 which attaches the former to the wheel house of the engine compartment assembly 102 via the feeder conveyor. After attaching the bar-code label to the engine compartment assembly, the bar-code reader installed at the bar-code station 600 reads the bar code in the label to supply the read data to the controller 604. The controller compares the data fed from the bar-code reader 610 with the date from the master controller 612 and stored in a register or RAM in order to confirm that the encoded data correctly corresponds to the data indicative of the model, type and specifications of the vehicle body to be assembled.

Bar-code labels prepared according to the foregoing process by means of the punch press are particularly effective in manufacturing processes including painting processes, in which conventional printed bar-code labels are wholly useless. The data encoded in the bar-code label according to the present invention can be read by means of an optical reader, such as the combination of a light-emitting element and photosensitive element, as set forth above, or by means of a laser scanner.

In addition, fabrication of the bar-code label according to the present invention is sufficiently efficient to allow repeated, continuous encoding of bar-codes onto blank labels. Such efficiency is very important in manufacturing processes in which the time period allowed for preparation is very short, such as in the automotive industry. Furthermore, according to the present invention, since the narrower slots and the wider slots are formed in separate, successive groups, the operation of the encoding device can be simplified to provide satisfactory efficiency.

While the specific embodiment has been described hereabove with reference to the accompanying drawings, the invention should not be understood as limited to the shown embodiment. Any modifications should be regarded as within the scope of the invention as defined by the appended claims.

What is claimed is:

1. A bar-code label for identifying components to be assembled into an assembly to be manufactured and for controlling manufacturing operations which includes painting process for painting of said manufactured assembly, comprising:
   a blank label in a form of a thin metal sheet and adapted to be attached to a selected one of said components;
   a plurality of identical first slots formed in said label;
   a plurality of identical second slots formed in said label, said second slots being larger than said first slots; and
   said first and second slots being so arranged in combination as to be indicative of said components and required manufacturing operations.

2. The bar-code label as set forth in claim 1, wherein said first and second slots are rectangular slots having different widths, said first slots representing binary "0" and said second slots representing binary "1".

3. The bar-code label as set forth in claim 2, wherein said second slots have a width 2.8–3.0 times larger than that of said first slots.

4. The bar-code label as set forth in claim 2, wherein said slots are adapted to be read by means of an optical sensor which produces a digital signal corresponding to combination of the first and second slots.

5. The bar-code label as set forth in claim 2, wherein said slots are adapted to be read by means of a laser sensor which produces a digital signal corresponding to combination of the first and second slots.

6. A bar-code label for identifying components to be assembled into a vehicle body assembly to be manufactured and for controlling a manufacturing operation of the vehicle body assemblies, which includes painting process for painting of said manufactured vehicle body assembly, comprising:
   a thin rectangular metal sheet label blank adapted to be attached to a selected one of said components;
   a plurality of identical first slots formed in said label blank;
   a plurality of identical second slots formed in said label blank, said second slots being larger than said first slots; and
   said first and second slots being arranged in alignment along with one peripheral edge of said label blank with given intervals therebetween, to indicate predetermined binary identifying data of said components to be assembled and required manufacturing operations.

7. A bar-code label for identifying components to be assembled into a vehicle body assembly to be manufactured and for controlling a manufacturing operation of the vehicle body assemblies, which includes painting process for painting of said manufactured vehicle body assembly, comprising:
- a rectangular thin metal sheet label blank adapted to be attached to a selected one of said components;
- a plurality of identical first punched slots formed in said label blank;
- a plurality of identical second punched slots formed in said label blank, said second punched slots being larger than said first slots; and
- said first and second punched slots being arranged in alignment along with one peripheral edge of said label blank with given intervals therebetween, for indicating a predetermined binary identifying data of said components to be assembled and required manufacturing operations.

8. A bar-code label for identifying components to be assembled into a vehicle body assembly to be manufactured and for controlling manufacturing operations of the vehicle body assembly, which includes painting process for painting of said manufactured vehicle body assembly, comprising:
- a thin rectangular metal sheet label blank adapted to be attached to a selected one of said components;
- a plurality of identical first punched slots formed in said label blank;
- a plurality of identical second punched slots formed in said label blank, said second punched slots being larger than said first slots; and
- said first and second punched slots arranged in alignment with a peripheral edge of said label blank with variable inter-slot intervals therebetween for indicating predetermined binary identifying data of said components to be assembled and required manufacturing operations in combination.

9. A bar-code label for identifying components to be assembled into various models, specifications, types of vehicle body assemblies which require different components and different manufacturing operations, and for controlling manufacturing operations of the vehicle body assemblies, which include painting process for painting of said manufactured vehicle body assembly, comprising:
- a thin, rectangular metal sheet label blank adapted to be attached to a selected one of said components;
- a plurality of identical first punched slots formed in said label blank;
- a plurality of identical second punched slots formed in said label blank, said second punched slots being larger than said first slots; and
- said first and second punched slots being so arranged in alignment along with one peripheral edge of said label blank with variable inter-slots intervals therebetween for indicating a predetermined binary identifying data of said components to be assembled and required manufacturing operations in combination.

* * * * *